(12) United States Patent
Kubota et al.

(10) Patent No.: US 9,664,879 B2
(45) Date of Patent: May 30, 2017

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Tomohiro Yonezawa, Tochigi (JP)

(73) Assignees: OPTICAL LOGIC INC., Nagano (JP); KANTATSU CO., LTD., Tochigi (JP)

(*) Notice: Subject to any disclaimer, the term of this patent is extended or adjusted under 35 U.S.C. 154(b) by 0 days.

(21) Appl. No.: 14/634,966

(22) Filed: Mar. 2, 2015

(65) Prior Publication Data

US 2015/0177488 A1    Jun. 25, 2015

Related U.S. Application Data

(63) Continuation of application No. 14/090,464, filed on Nov. 26, 2013, now Pat. No. 9,001,439.

(30) Foreign Application Priority Data

Nov. 30, 2012 (JP) ................. 2012-262095

(51) Int. Cl.
*G02B 13/18* (2006.01)
*G02B 3/02* (2006.01)
*G02B 9/34* (2006.01)
*G02B 13/00* (2006.01)

(52) U.S. Cl.
CPC ............. *G02B 13/004* (2013.01); *G02B 9/34* (2013.01)

(58) Field of Classification Search
CPC .................... G02B 9/34; G02B 13/004
USPC ........................... 359/715, 781, 783
See application file for complete search history.

(56) References Cited

U.S. PATENT DOCUMENTS

| 4,130,350 | A  | * | 12/1978 | Koizumi | G02B 21/02 359/659 |
|---|---|---|---|---|---|
| 5,684,635 | A | * | 11/1997 | Sugawara | G02B 25/001 359/643 |
| 8,014,080 | B1 | * | 9/2011 | Chen | G02B 9/34 359/644 |
| 8,179,616 | B1 | * | 5/2012 | Hsu | G02B 9/34 359/715 |
| 2011/0157453 | A1 | * | 6/2011 | Chen | G02B 13/004 348/340 |
| 2013/0107376 | A1 | * | 5/2013 | Tsai | G02B 13/06 359/714 |
| 2014/0098432 | A1 | * | 4/2014 | Kubota | G02B 13/004 359/781 |

FOREIGN PATENT DOCUMENTS

JP    2011-145665 A    7/2011

* cited by examiner

*Primary Examiner* — William Choi
(74) *Attorney, Agent, or Firm* — Kubotera & Associates, LLC

(57) ABSTRACT

An imaging lens includes a first lens having negative refractive power; a second lens having positive refractive power; a third lens; and a fourth lens arranged in the order from an object side to an image plane side. The first lens has an image plane-side surface having a positive curvature radius. The first lens has a specific focal length to satisfy a specific conditional expression.

14 Claims, 18 Drawing Sheets

IMAGING LENS

CROSS-REFERENCE TO RELATED APPLICATIONS

This is a continuation application of a prior application Ser. No. 14/090,464, filed on Nov. 26, 2013, allowed, which claims priority of Japanese Patent Application No. 2012-262095, filed on Nov. 30, 2012.

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a cellular phone, a digital still camera, a portable information terminal, a security camera, a vehicle onboard camera, a network camera, a video conferencing camera, a fiberscope, and an encapsulated endoscope.

In these years, there have been available some vehicles equipped with a plurality of cameras for a purpose of enhancing convenience and security. For example, in case of a vehicle equipped with a backup camera to take an image behind the vehicle, since a driver can see the rear view of the vehicle on a monitor upon backing up the vehicle, the driver can safely move the vehicle backward without hitting an object even if any, although such an object is not visible from the driver due to shadow of the vehicle. Such a camera mounted on a vehicle, i.e., a so-called onboard camera, is expected to be continuously on demand.

The onboard cameras are often accommodated in a relatively small space such as in a backdoor, a front grill, a side mirror, and inside of the vehicle. For this reason, an imaging lens to be mounted in the onboard camera is required to have a compact size. Further, the onboard camera is required to be compatible with a high resolution resulting from a high-pixel density imaging element, and to have a wide angle to be compatible with a wide imaging range. However, it is difficult to attain a small size and compatibility with the high resolution while satisfactorily correcting aberrations, and further attain a wide imaging angle. For example, when a size of an imaging lens is reduced, refractive power of each lens tends to become stronger. Accordingly, it is difficult to satisfactorily correct aberrations. Therefore, upon actually designing the imaging lens, it is important to satisfy those demands in a balanced manner.

As a wide-angle imaging lens that has a wide imaging angle, for example, there is known an imaging lens described in Patent Reference. The imaging lens includes a first lens that has a shape of a meniscus lens directing a convex surface thereof to an object side and is negative; a second lens that has a shape of a meniscus lens directing a concave surface thereof to the object side and is positive; a third lens that is positive; and a fourth lens that is positive, arranged in the order from the object side.

Patent Reference: Japanese Patent Application Publication No. 2011-145665

According to the imaging lens disclosed in Patent Reference, the second lens is made of a material having Abbe's number between 23 and 40, and the third lens is made of a material having Abbe's number between 50 and 85. Furthermore, according to the imaging lens, a ratio (f/D) of a focal length f of the whole lens system and a distance D from an incident surface on the object side to an image-forming surface is restrained within certain ranges. Accordingly, it is possible to obtain a wide angle of view and a small size, and also satisfactorily correct a chromatic aberration.

According to the imaging lens disclosed in Patent Reference, although the number of lenses that compose the imaging lens is as few as four, an imaging angle of view is wide and it is also possible to relatively satisfactorily correct aberrations. However, demands for such a wide-angle imaging lens have become diversified each year, and especially in these years, there are strong demands for being capable of manufacturing the imaging lens inexpensively, i.e., an imaging lens that is easy to assemble with high productivity, as well as the demands to be compatible to high-resolution imaging elements and to have a small size.

In case of the conventional wide-angle imaging lens including the imaging lens disclosed in Patent Reference, the first lens has very strong negative refractive power relative to other lenses in order to attain a wide angle of view. For this reason, a curvature radius of an image plane-side surface of the first lens is small, and thereby a so-called semispherical ratio is close to 1.0 (semispherical shape), which results in poor workability of the lens.

Further, the image plane-side surface of the first lens is frequently coated with an antireflection coating or the like, and there is a serious issue of insufficient coating a periphery of the lens surface in case of a lens having the semispherical ratio near 1.0 described above. Furthermore, in case of the imaging lens, in which the first lens has strong refractive power and has the semispherical ratio near 1.0, the sensitivity to deterioration of image-forming performance due to decentering (eccentricity), tilting, etc. occurred upon manufacturing of the imaging lens, i.e., production error sensitivity, is high, and there is a limit by itself for reduction of the manufacturing cost.

Here, those issues are not unique to an imaging lens for mounting on an onboard camera, but are common in imaging lenses for mounting in relatively small cameras, such as cellular phones, digital still cameras, portable information terminals, security cameras, network cameras, video conferencing cameras, fiberscopes, and encapsulated endoscopes.

In view of the above-described problems of conventional techniques, there is provided an invention, an object of which is to provide an imaging lens that has a wide imaging angle of view despite of a small size thereof and can suitably reduce the manufacturing cost.

Further objects and advantages of the present invention will be apparent from the following description of the present invention.

SUMMARY OF THE INVENTION

In order to attain the objects described above, according to a first aspect of the invention, an imaging lens includes a first lens that has negative refractive power; a second lens having positive refractive power; a third lens having positive refractive power; a stop; and a fourth lens having positive refractive power, arranged in the order from an object side to an image plane side. The first lens has an image plane-side surface having a positive curvature radius. The second lens has an image plane-side surface having negative curvature radius. The third lens has an image plane-side surface having a negative curvature radius. The fourth lens has an object-side surface having a positive curvature radius and an image plane-side surface having a negative curvature radius. Furthermore, when the whole lens system has a focal length f, the first lens has a focal length f1, and the first lens has Abbe's number vd1, the imaging lens of the invention having the above-described configuration satisfies the following conditional expressions (1) and (2):

$$-75 < f1/f < -5.0 \quad (1)$$

$$45 < vd1 < 70 \quad (2)$$

When the imaging lens satisfies the conditional expression (1), it is possible to restrain a chromatic aberration, a distortion, an astigmatism, and a field curvature within satisfactory ranges respectively in a balanced manner, while attaining downsizing of the imaging lens. When the value exceeds the upper limit of "−5.0", the negative refractive power of the first lens is strong relative to the whole lens system, which is advantageous for correction of the distortion, the astigmatism, a chromatic aberration of magnification, etc. However, since an axial chromatic aberration is insufficiently corrected (a focal position at a short wavelength moves to the object side relative to a focal position at a reference wavelength), it is difficult to obtain satisfactory image-forming performance. Furthermore, since incident pupil moves to the object side, a back focal length is long, so that it is difficult to downsize the imaging lens.

On the other hand, when the value is below the lower limit of "−75", the negative refractive power of the first lens is weak relative to the whole lens system, the chromatic aberration of magnification is insufficiently corrected, and negative distortion increases. Furthermore, since periphery of the image-forming surface curves to the object side, it is difficult to restrain the field curvature within a satisfactory range. Therefore, also in this case, it is difficult to obtain satisfactory image-forming performance.

In most cases, the first lens of a conventional wide-angle imaging lens has strong refractive power relative to that of the whole lens system. Also in case of the imaging lens of the invention, the first lens has negative refractive power in order to attain a wide angle of view. However, as shown in the conditional expression (1), the first lens has weak refractive power relative to that of the whole lens system. Therefore, the curvature radius of the image plane-side surface of the first lens is large, and so-called hemispheric ratio is away from 1.0. Therefore, an image plane-side concave surface of the first lens has a half-elliptic shape that is recessed in a direction perpendicular to the optical axis. For this reason, according to the imaging lens of the invention, it is easy to evenly apply coating such as anti-reflection coating, and it is possible to improve the yield upon manufacturing the imaging lens. Furthermore, since the first lens has relatively weak refractive power, it is possible to suitably reduce sensitivity (production error sensitivity) to deterioration of the image-forming performance due to decentering (eccentricity), tilting, etc. occurred upon manufacturing the imaging lens.

When the imaging lens satisfies the conditional expression (2), it is possible to effectively restrain occurrence of the chromatic aberration. Having Abbe's number of the first lens greater than the lower limit of "45", it is possible to effectively restrain the chromatic aberration generated in the first lens. Furthermore, generally in case of a wide-angle imaging lens, the first lens has the largest effective diameter. Having the Abbe's number of the first lens smaller than the upper limit of "75", it is not necessary to use an expensive material, and it is possible to suitably attain reduction of manufacturing cost for the imaging lens.

The imaging lens having the above-described configuration may be preferably configured to further satisfy the following conditional expression (1-A). When the imaging lens satisfies the conditional expression (1-A), it is possible to satisfactorily correct aberrations and more effectively restrain manufacturing cost by reducing unsatisfactory application of coating such as anti-reflection coating and reduction of the production error sensitivity.

$$-50 < f1/f < -10 \quad (1\text{-A})$$

According to a second aspect of the present invention, in the imaging lens having the above-described configuration, the first lens may be preferably formed as an aspheric shape so as to have stronger negative refractive power as it goes from the optical axis towards the periphery. As described above, according to the first aspect of the present invention, the first lens has weaker refractive power than conventional one. For this reason, how to correct the filed curvature is a key. From this point of view, in case of the imaging lens of the invention, since the first lens has strong refractive power at the periphery than that near the optical axis, correction at the periphery of the image-forming surface is satisfactorily made, and aberrations including the field curvature are satisfactorily corrected.

According to a third aspect of the present invention, in the imaging lens having the above-described configuration, the focal length of the first lens, the focal length of the second lens, and the focal length of the third lens may be preferably longer than three times the focal length of the fourth lens, respectively.

As well known, an imaging element of a CCD sensor, CMOS sensor, or the like has a predetermined so-called "chief ray angle (CRA)", a range of an incident angle of a light beam that can be taken by the sensor. Restraining the incident angle of a light beam emitted from the imaging lens to the image plane within the CRA range, it is possible to suitably restrain generation of shading, which is a phenomenon of having dark periphery in an image. For this reason, with the fourth lens, which is disposed most closely to the image plane, has the strongest refractive power, the imaging lens of the invention can have a configuration capable of suitably restraining the incident angle of a light beam emitted from the imaging lens to the imaging element.

As a result of optical simulations, it was found that it is achievable to obtain a wide angle of view, corrections of aberrations, etc. in a balanced manner while attaining downsizing of the imaging lens, by having the focal length of the first lens, the focal length of the second lens, and the focal length of the third lens longer than three times the focal length of the fourth lens. Furthermore, since three out of the four lenses have weak refractive powers as described above, it is possible to even more effectively reduce the production error sensitivity.

In view of reduction of the manufacturing cost, it is preferred to form each lens from a resin material. However, for example, in case of an imaging lens for an onboard camera to be mounted in an automobile, since it is not rare that a temperature inside the vehicle exceeds 70° C. in the midsummer hot sun, it is a critical issue upon designing to restrain fluctuation of the focal length due to the temperature changes. For such imaging lens used under severe environment, it is conventionally necessary to form each lens from a glass material, which results in increase of the manufacturing cost.

Therefore, for the imaging lens having the above-described configuration, it is preferred to form the fourth lens from a glass-based material. As described above, according to the imaging lens of the invention, only the fourth lens has strong refractive power. For this reason, forming the fourth lens, which has strong refractive power, from a glass-based material, it is possible to minimize the fluctuation of the focal length of the imaging lens due to temperature changes in the surrounding environment. On the other hand, three lenses from the first to the third lenses have relatively weak refractive power, so that the fluctuation of the focal length due to temperature changes is small. Accordingly, it is possible to not only form those three lenses from glass-based materials, but also form from resin materials.

According to a fourth aspect of the present invention, when the fourth lens has a focal length f4, the imaging lens having the above-described configuration may be preferably configured to satisfy the following conditional expression (3):

$$1.0 < f4/f < 2.5 \quad (3)$$

When the imaging lens satisfies the conditional expression (3), it is possible to satisfactorily correct distortion while attaining downsizing of the imaging lens. Furthermore, when the imaging lens satisfies the conditional expression (3), it is also possible to suitably restrain an incident angle of a light beam emitted from the imaging lens to an imaging element within the CRA range. When the value exceeds the upper limit of "2.5", since the fourth lens has weak refractive power, although it is effective for correcting distortion, the axial chromatic aberration is insufficiently corrected, so that it is difficult to obtain satisfactory image-forming performance.

Furthermore, it is difficult to restrain an incident angle of a light beam emitted from the imaging lens to the imaging element within the CRA range. On the other hand, when the value is below "1.0", since the fourth lens has relatively strong refractive power, it is easier to restrain the incident angle of a light beam emitted from the imaging lens to the imaging element within the CRA range. However, since the distortion increases and the off-axis chromatic aberration of magnification is insufficiently corrected, also in this case, it is difficult to obtain satisfactory image-forming performance.

According to a fifth aspect of the present invention, when the fourth lens has a focal length f4 and a composite focal length of the second lens and the third lens is f23, the imaging lens having the above-described configuration may be preferably configured to satisfy the following conditional expression (4):

$$0.2 < f4/f23 < 1.0 \quad (4)$$

When the imaging lens satisfies the conditional expression (4), it is possible to restrain an astigmatism, a chromatic aberration, and a distortion within satisfactory ranges in a balanced manner. When the value exceeds the upper limit of "1.0", among the lenses having positive refractive power, the fourth lens has relative weak refractive power, which is effective for correcting the off-axis chromatic aberration of magnification, the axial chromatic aberration is insufficiently corrected and astigmatic difference increases, so that it is difficult to obtain satisfactory image-forming performance. On the other hand, when the value is below "0.2", among the lenses having positive refractive power, the fourth lens has relatively strong refractive power, and the off-axis chromatic aberration of magnification is insufficiently corrected and a sagittal image surface of the astigmatism curves to the object side. Furthermore, since the distortion also increases, it is difficult to obtain satisfactory image-forming performance.

According to a sixth aspect of the present invention, when a composite focal length from the first lens to the third lens is f123, the imaging lens having the above-described configuration may be preferably configured to satisfy the following conditional expression (5):

$$2.0 < f123/f < 5.0 \quad (5)$$

When the imaging lens satisfies the conditional expression (5), it is possible to satisfactorily correct the chromatic aberration, while attaining downsizing of the imaging lens. Furthermore, when the imaging lens satisfies the conditional expression (5), it is also possible to suitably restrain the incident angle of a light beam emitted from the imaging lens to the imaging element within the CRA range. When the value exceeds the upper limit of "5.0", since the composite refractive power of the first lens to the third lens, which are arranged on the object side relative to the stop, the back focal length is long and it is difficult to attain downsizing of the imaging lens.

Furthermore, the chromatic aberration of magnification is insufficiently corrected near periphery of the image and it is difficult to obtain satisfactory image-forming performance. On the other hand, when the value is below "2.0", although it is effective for downsizing of the imaging lens and satisfactory correction of the chromatic aberration of magnification, it is difficult to restrain the incident angle of a light beam emitted from the imaging lens to the imaging element within the CRA range.

According to a seventh aspect of the present invention, when a distance on an optical axis between the first lens and the second lens is dA, the imaging lens having the above-described configuration may be preferably configured to satisfy the following conditional expression (6):

$$0.3 < dA/f < 1.0 \quad (6)$$

When the imaging lens satisfies the conditional expression (6), it is possible to satisfactorily correct the distortion and the astigmatism while attaining downsizing of the imaging lens. When the value exceeds the upper limit of "1.0", the size of the first lens is big, so that it is difficult to attain downsizing of the imaging lens. Furthermore, an off-axis chromatic aberration of magnification is insufficiently corrected and it is difficult to correct periphery of a tangential image surface, so that it is difficult to obtain satisfactory image-forming performance. On the other hand, when the value is below the lower limit of "0.3", although it is effective for downsizing of the imaging lens, a sagittal image surface of the astigmatism curves to the object side, and astigmatic difference increases. Furthermore, since the distortion increases, it is difficult to obtain satisfactory image-forming performance.

According to an eighth aspect of the present invention, when the third lens has Abbe's number vd3 and the fourth lens has Abbe's number vd4, the imaging lens may be preferably configured to satisfy the conditional expressions (7) and (8):

$$20 < vd3 < 40 \quad (7)$$

$$45 < vd4 < 70 \quad (8)$$

When the imaging lens satisfies the conditional expressions (7) and (8), it is possible to restrain the chromatic aberration within satisfactory range. Forming the third lens and the fourth lens, which are disposed across the stop from each other, from a material having Abbe's number within the ranges indicated by the conditional expressions (7) and (8), it is possible to satisfactorily correct the axial and off-axis chromatic aberrations.

When a half angle of view of the lens system is ω, the imaging lens having the above-described configuration preferably satisfies "135°≤2ω". The imaging lens of the invention is especially effective for an imaging lens that is required to have an angle of view not smaller than 135°.

According to the imaging lens of the invention, it is possible to provide a small-sized imaging lens that can suitably attain both a wide angle of the imaging lens and reduction of manufacturing cost. Moreover, according to the imaging lens of the invention, it is possible to provide an imaging lens having less fluctuation in focal length due to temperature changes of the surrounding environment.

DETAILED DESCRIPTION OF PREFERRED EMBODIMENTS

Hereunder, referring to the accompanying drawings, an embodiment of the present invention will be fully described.

FIGS. 1, 4, 7, 10, 13, and 16 are schematic sectional views of imaging lenses in Numerical Data Examples 1 to 6 according to the embodiment, respectively. Since a basic lens configuration is the same among those Numerical Data Examples, the lens configuration of the embodiment will be described with reference to the illustrative sectional view of Numerical Data Example 1.

Figure 1:
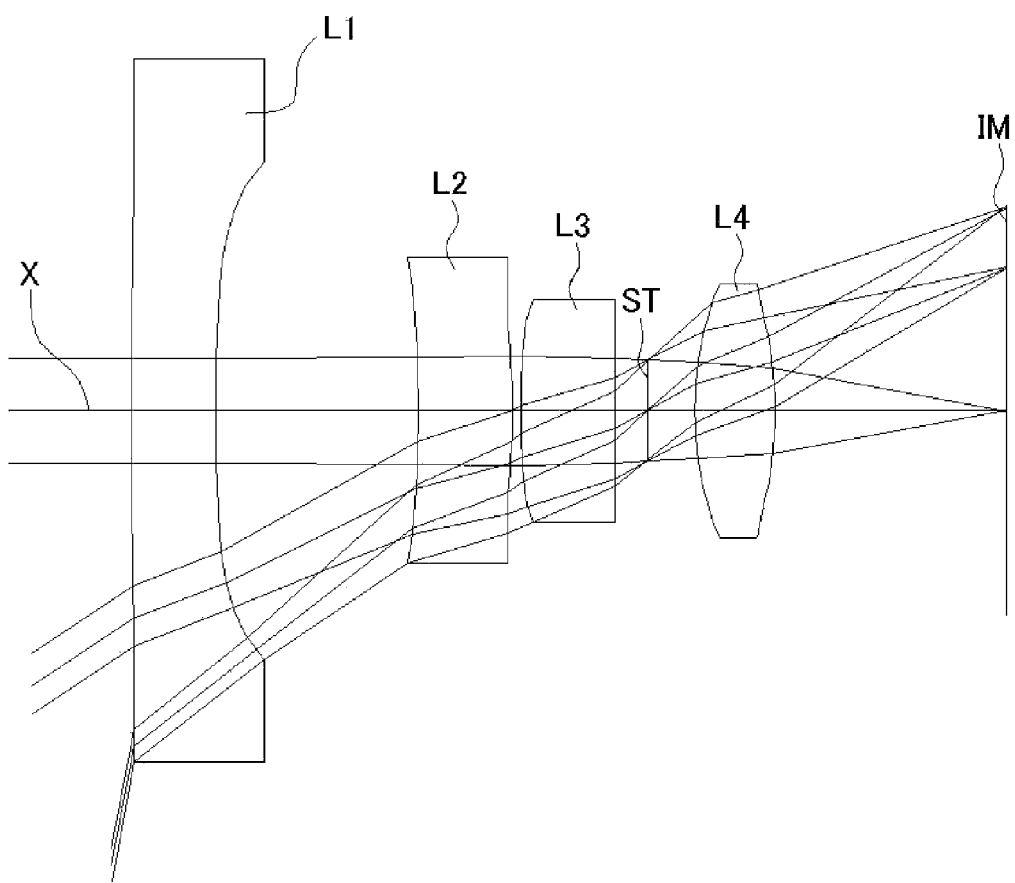
FIG. 1 shows a sectional view of a schematic configuration of an imaging lens in Numerical Data Example 1 according to an embodiment of the invention.

As shown in FIG. 1, the imaging lens of the embodiment includes a first lens L1 having negative refractive power; a second lens L2 having positive refractive power; a third lens L3 having positive refractive power; an aperture stop ST; and a fourth lens L4 having positive refractive power, arranged in the order from an object side to an image plane side. Here, an infrared cutoff filter, a cover glass, or the like may be provided between the fourth lens L4 and an image plane IM.

The first lens L1 is formed in a shape, such that a curvature radius of an object-side surface thereof r1 and a curvature radius of an image plane-side surface thereof r2 are both positive so as to have a shape of a meniscus lens directing a convex surface thereof to the object side near an optical axis X. In addition, the first lens L1 is formed as an aspheric shape so as to have stronger refractive power as it is close to the periphery from the optical axis X.

More specifically, the first lens L1 has stronger negative refractive power as it goes to the periphery from a part that is around 70% of the maximum effective diameter. Here, the shape of the first lens L1 is not limited to the shape of a meniscus lens directing a convex surface thereof to the object side near the optical axis X. The first lens L1 can have any shape as long as the curvature radius of the image plane-side surface thereof r2 is positive, and can be shaped such that the curvature radius r1 is negative, i.e. a shape of biconcave lens near the optical axis X. Numerical Data Examples 1 and 2 are examples, in which the shape of the first lens L1 is that of a meniscus lens directing the convex surface thereof to the object side near the optical axis X, and Numerical Data Examples 3 to 6 are examples, in which the shape of the first lens L1 is that of a biconcave lens near the optical axis X.

The second lens L2 is formed in a shape such that a curvature radius of an object-side surface thereof r3 and a curvature radius of an image plane-side surface thereof r4 are both negative and is formed so as to have a shape of a meniscus lens directing a concave surface thereof to the object side near the optical axis X. Among them, the image plane-side surface of the second lens L2 is formed as an aspheric surface directing a concave surface thereof to the object side near the optical axis X and directing a convex surface thereof to the object side at the lens periphery. In short, the second lens L2 of the embodiment is formed as an aspheric surface shape such that an image plane-side surface thereof has an inflexion point and has a shape of a meniscus lens directing a concave surface thereof to the object side near the optical axis X, and has a shape of a biconcave lens at lens periphery that is away from the optical axis X.

In case of the wide-angle imaging lens such as the one according to the invention, it is important how to correct the curvature at the periphery of the image plane for the wide angle of imaging coverage, in order to obtain satisfactory aberration. In this view, with such aspheric shape of the second lens L2, since the curvature at the periphery of the image plane is suitably restrained, it is possible to satisfactorily correct the field curvature. Here, the shape of the second lens L2 is not limited to that of the meniscus lens directing a concave surface thereof to the object side near the optical axis X. The second lens L2 can have any shape, as long as the curvature radius of the image plane-side surface thereof r4 is negative, and can be formed in a shape such that the curvature radius r3 is positive, i.e. a shape of a biconvex lens near the optical axis X.

The third lens L3 is formed in a shape such that a curvature radius of an object-side surface r5 is positive and a curvature radius of an image plane-side surface r6 is negative, so as to have a shape of a biconvex lens near the optical axis X. The shape of the third lens L3 is not limited to the shape of the biconvex lens near the optical axis X. The third lens L3 can have any shape as long as the curvature radius of the image plane-side surface r6 is negative and can be formed in a shape such that the curvature radius r5 is negative, i.e. a shape of a meniscus lens directing a concave surface to the object side near the optical axis X. Numerical Data Examples 1 to 4 are examples for that the third lens L3 has a shape of a biconvex lens near the optical axis X, and Numerical Data Examples 5 and 6 are examples for that the third lens L3 has a shape of a meniscus lens directing a concave surface thereof to the object side near the optical axis X.

According to the imaging lens of the embodiment, the focal length of the first lens L1, the focal length of the second lens L2, and the focal length of the third lens L3 are respectively longer than three times the focal length of the fourth lens L4. In other words, when the first lens L1 has a focal length f1, the second lens L2 has a focal length f2, the third lens L3 has a focal length f3, and the fourth lens L4 has a focal length f4, the imaging lens of the embodiment satisfies the following conditional expressions.

$$f1>3\times f4, f2>3\times f4, \text{ and } f3>3\times f4$$

The fourth lens L4 is formed in a shape such that a curvature radius of an object-side surface thereof r8 is positive and a curvature radius of an image plane-side surface thereof r9 is negative, so as to have a shape of a biconvex lens near the optical axis X.

Furthermore, the imaging lens of the embodiment satisfies the following respective conditional expressions. Therefore, according to the imaging lens of the embodiment, it is possible to suitably attain a wide angle of the imaging lens and reduction of the manufacturing cost, as well as satisfactorily correct an aberration in spite of the small size thereof.

$$-75 < f1/f < -5.0 \tag{1}$$

$$45 < vd1 < 70 \tag{2}$$

$$1.0 < f4/f < 2.5 \tag{3}$$

$$0.2 < f4/f23 < 1.0 \tag{4}$$

$$2.0 < f123/f < 5.0 \tag{5}$$

$$0.3 < dA/f < 1.0 \tag{6}$$

$$20 < vd3 < 40 \tag{7}$$

$$45 < vd4 < 70 \tag{8}$$

In the above conditional expressions:
f: Focal length of whole lens system
f1: Focal length of a first lens L1
f23: Composite focal length of a second lens L2 and a third lens L3
f4: Focal length of a fourth lens L4
f123: Composite focal length from the first lens L1 to the third lens L3 dA: Distance on an optical axis between the first lens L1 and the second lens L2
vd1: Abbe's number of the first lens L1
vd3: Abbe's number of the third lens L3
vd4: Abbe's number of the fourth lens L4

The imaging lens of the embodiment preferably further satisfies the following conditional expression (1-A):

$$-50 < f1/f < -10 \tag{1-A}$$

When the imaging lens satisfies the conditional expression (1-A), the first lens L1 has weaker refractive power, so that the first lens L1 is formed in a shape having a small difference between the thickness on an optical axis and the thickness of periphery, i.e. a shape having a small change in the thickness from the lens center to the periphery. With this configuration, it is possible to improve workability of the first lens L1, and also it is easy to evenly apply antireflection coating from the center part of the lens to the periphery. Here, Numerical Data Example 1 and Numerical Data Examples 3 to 6 are examples that satisfy the above conditional expression (1-A), and Numerical Data Example 2 is an example that does not satisfy the conditional expression (1-A).

Here, it is not necessary to satisfy all of the respective conditional expressions, and it is achievable to obtain an effect corresponding to the respective conditional expression when any single one of the conditional expressions is individually satisfied.

In the embodiment, any lens surface of the respective lenses is formed as an aspheric surface. When the aspheric surfaces applied to the lens surfaces have an axis Z in a direction of the optical axis X, a height H in a direction perpendicular to the optical axis X, a conical coefficient k, and aspheric coefficients $A_4$, $A_6$, $A_8$, $A_{10}$, and $A_{12}$, a shape of the aspheric surfaces of the lens surfaces is expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12}$$

Next, Numerical Data Examples of the imaging lens of the embodiment will be described. In each Numerical Data Example, f represents a focal length of the whole lens system, Fno represents an F number, and 2ω represents an angle of view, respectively. In addition, i represents a surface number counted from the object side, r represents a curvature radius, d represents a distance between lens surfaces (surface spacing) on the optical axis, nd represents a refractive index for a d line, and vd represents Abbe's number for the d line, respectively. Here, aspheric surfaces are indicated with surface numbers i affixed with * (asterisk). In addition, total surface spacing from the object-side surface of the first lens L1 to the image plane IM is indicated as L14.

Numerical Data Example 1

Basic data are shown below.
f = 3.13 mm, Fno = 2.8, 2ω = 161.4°
Unit: mm

Surface Data

| Surface Number i | r | d | nd | vd |
| --- | --- | --- | --- | --- |

-continued

Basic data are shown below.
f = 3.13 mm, Fno = 2.8, 2ω = 161.4°
Unit: mm

| | | | | |
|---|---|---|---|---|
| (Object) | ∞ | ∞ | | |
| 1* | 77.022 | 0.900 | 1.544 | 55.5 (=vd1) |
| 2* | 36.316 | 2.150 (=dA) | | |
| 3* | −13.337 | 1.000 | 1.544 | 55.5 (=vd2) |
| 4* | −7.152 | 0.090 | | |
| 5* | 14.685 | 1.000 | 1.636 | 23.9 (=vd3) |
| 6* | −37.790 | 0.350 | | |
| 7 (Stop) | ∞ | 0.500 | | |
| 8* | 3.751 | 0.850 | 1.544 | 55.5 (=vd4) |
| 9* | −4.549 | 2.480 | | |
| (Image plane) | ∞ | | | | f1 = −127.35 mm
f2 = 26.83 mm
f3 = 16.77 mm
f4 = 3.92 mm
f123 = 10.86 mm
f23 = 10.21 mm
L14 = 9.32 mm

Aspheric Surface Data

First Surface $k = 0.000$, $A_4 = -3.528E-04$, $A_6 = 2.507E-06$, $A_8 = -3.053E-08$, $A_{10} = -1.320E-09$
Second Surface $k = 0.000$, $A_4 = 5.781E-03$, $A_6 = -9.955E-05$, $A_8 = 1.217E-05$, $A_{10} = 8.349E-06$, $A_{12} = 1.168E-09$
Third Surface $k = 0.000$, $A_4 = 7.208E-04$, $A_6 = -6.424E-04$
Fourth Surface $k = 0.000$, $A_4 = 9.683E-03$, $A_6 = 8.629E-03$
Fifth Surface $k = 0.000$, $A_4 = 1.927E-02$, $A_6 = 1.505E-02$
Sixth Surface $k = 0.000$, $A_4 = 1.860E-02$, $A_6 = 5.481E-03$
Eighth Surface $k = 0.000$, $A_4 = -8.159E-03$, $A_6 = 6.618E-03$
Ninth Surface $k = 0.000$, $A_4 = -2.319E-02$, $A_6 = 1.532E-02$ The values of the respective conditional expressions are as follows:

f4/f = 1.26
f1/f = −40.75
f4/f23 = 0.38
dA/f = 0.69
f123/f = 3.47

Accordingly, the imaging lens of Numerical Data Example 1 satisfies the above-described conditional expressions.

Figure 2:
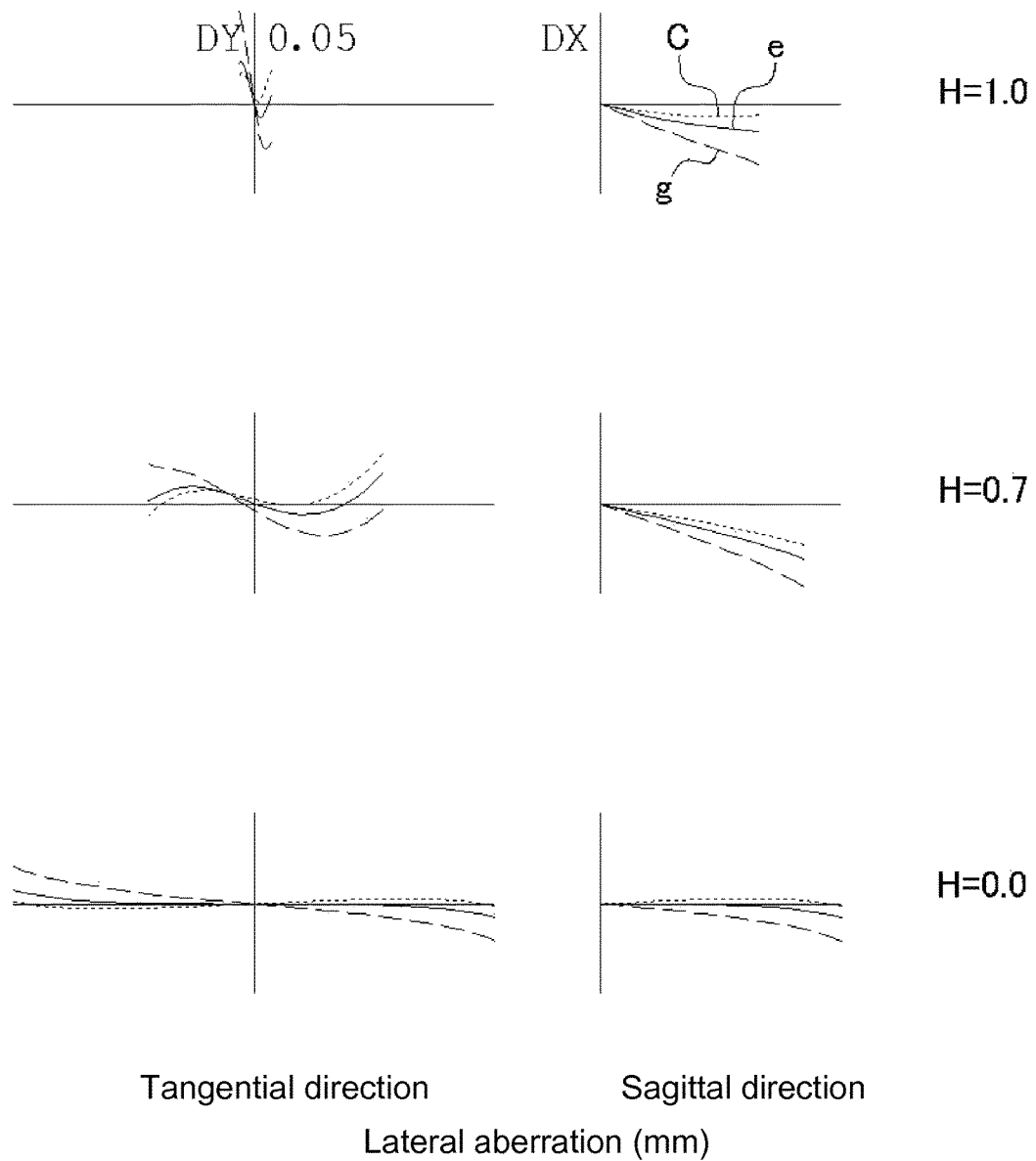
FIG. 2 is an aberration diagram showing a lateral aberration of the imaging lens of FIG. 1.

FIG. 2 shows a lateral aberration that corresponds to a ratio H of each image height to the maximum image height (hereinafter referred to as "image height ratio H"), which is divided into a tangential direction and a sagittal direction (which is the same in FIGS. 5, 8, 11, 14, and 17).

Figure 3:
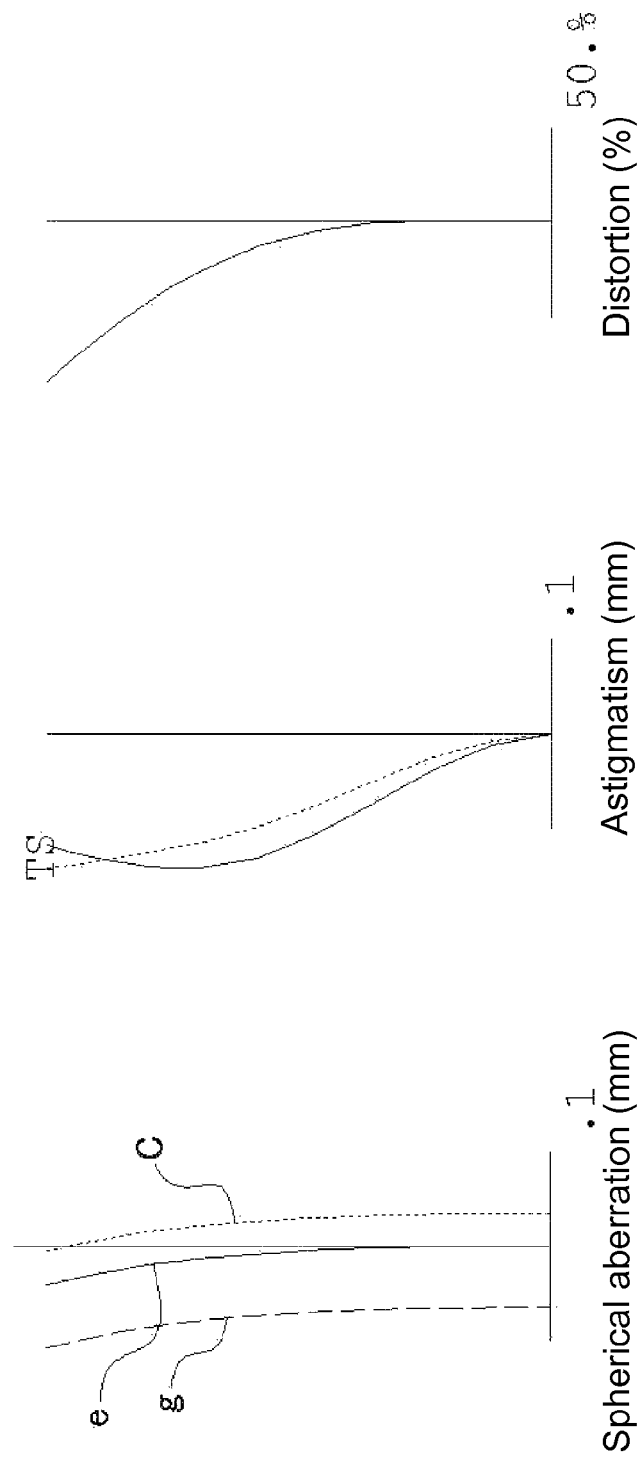
FIG. 3 is an aberration diagram showing a spherical aberration, an astigmatism, and a distortion of the imaging lens of FIG. 1.
Figure 4:
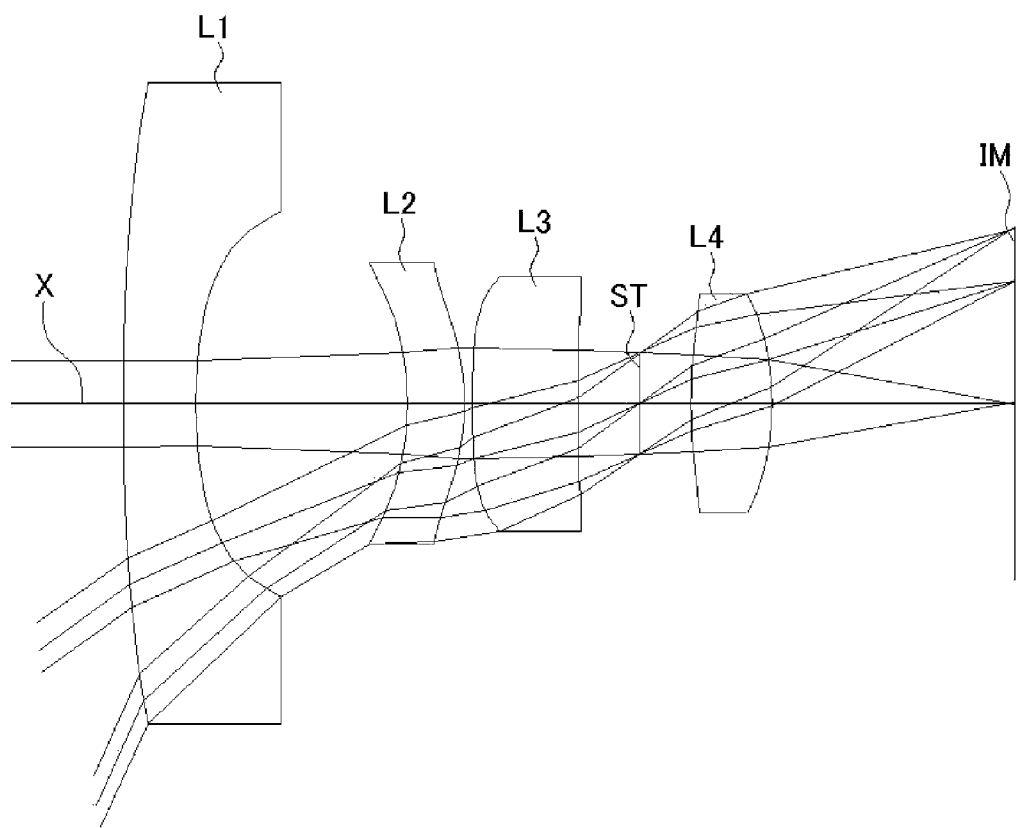
FIG. 4 shows a sectional view of a schematic configuration of an imaging lens in Numerical Data Example 2 according to the embodiment of the invention.

Furthermore, FIG. 3 shows a spherical aberration (mm), an astigmatism (mm), and a distortion (%) of the imaging lens in Numerical Data Example 1, respectively. In the aberration diagrams, for the lateral aberration diagrams and spherical aberration diagrams, aberrations at each wavelength, i.e. a g line (435.84 nm), an e line (546.07 nm), and a C line (656.27 nm) are indicated. In astigmatism diagram, an aberration on a sagittal image surface S and an aberration on a tangential image surface T are respectively indicated (which are the same in FIGS. 6, 9, 12, 15, and 18). As shown in FIGS. 2 and 3, according to the imaging lens of Numerical Data Example 1, the aberrations are satisfactorily corrected.

Numerical Data Example 2

Basic data are shown below.
f = 3.00 mm, Fno = 2.8, 2ω = 141.0°
Unit: mm

Surface Data

| Surface Number i | r | d | nd | vd |
|---|---|---|---|---|
| (Object) | ∞ | ∞ | | |
| 1* | 30.000 | 0.893 | 1.544 | 55.5 (=vd1) |
| 2* | 6.386 | 2.608 (=dA) | | |
| 3* | −3.553 | 0.704 | 1.636 | 23.9 (=vd2) |
| 4* | −2.919 | 0.097 | | |
| 5* | 16.822 | 1.314 | 1.636 | 23.9 (=vd3) |
| 6* | −34.079 | 0.750 | | |
| 7 (Stop) | ∞ | 0.630 | | |
| 8* | 5.272 | 0.998 | 1.544 | 55.5 (=vd4) |
| 9* | −3.897 | 3.021 | | |
| (Image plane) | ∞ | | | | f1 = −15.12 mm
f2 = 17.98 mm
f3 = 17.90 mm
f4 = 4.29 mm
f123 = 13.14 mm
f23 = 8.72 mm
L14 = 11.02 mm

Aspheric Surface Data

First Surface $k = 0.000$, $A_4 = -8.666E-05$, $A_6 = 1.504E-05$, $A_8 = 1.574E-07$, $A_{10} = -8.510E-10$
Second Surface $k = 0.000$, $A_4 = 4.166E-03$, $A_6 = 2.556E-03$, $A_8 = -4.986E-04$, $A_{10} = 8.632E-05$, $A_{12} = 6.831E-10$
Third Surface $k = 0.000$, $A_4 = -2.552E-03$, $A_6 = 1.391E-04$
Fourth Surface $k = 0.000$, $A_4 = 1.052E-02$, $A_6 = 3.650E-03$
Fifth Surface $k = 0.000$, $A_4 = 1.341E-02$, $A_6 = 1.219E-02$
Sixth Surface $k = -4.226E+01$, $A_4 = -5.766E-03$, $A_6 = 2.322E-02$
Eighth Surface $k = 0.000$, $A_4 = -2.203E-02$, $A_6 = 1.284E-03$
Ninth Surface $k = 0.000$, $A_4 = -2.123E-02$, $A_6 = -3.270E-04$ The values of the respective conditional expressions are as follows:

f4/f = 1.43
f1/f = −5.04
f4/f23 = 0.49
dA/f = 0.87
f123/f = 4.38

Accordingly, the imaging lens of Numerical Data Example 2 satisfies the above-described conditional expressions.

Figure 5:
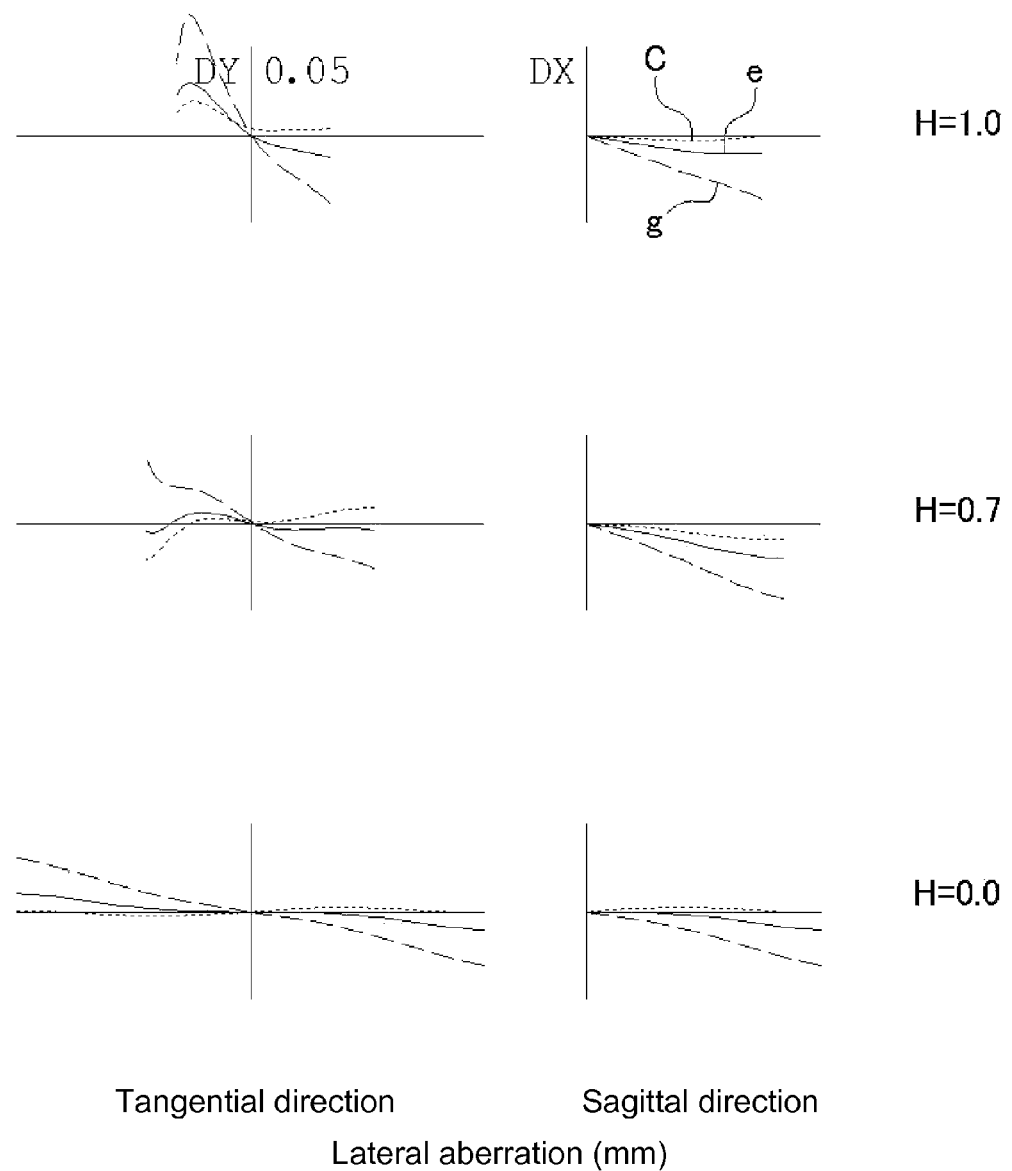
FIG. 5 is an aberration diagram showing a lateral aberration of the imaging lens of FIG. 4.
Figure 6:
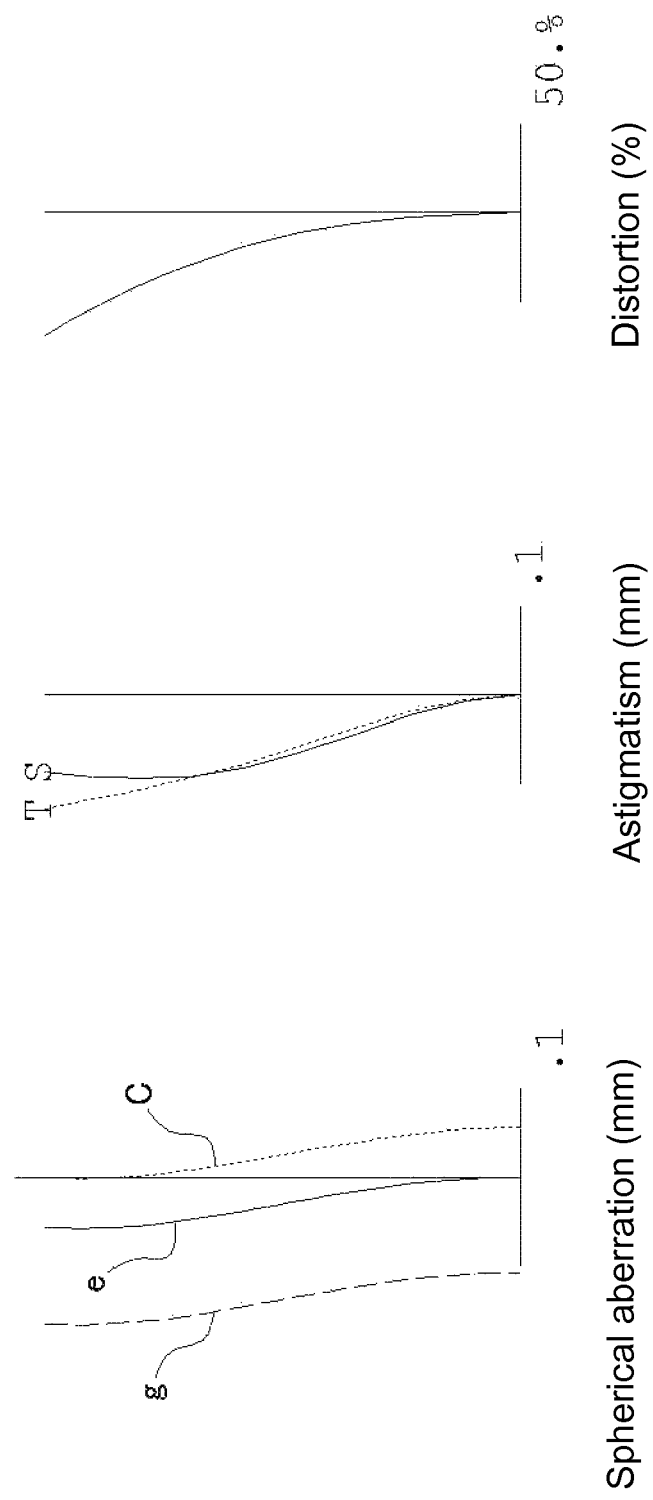
FIG. 6 is an aberration diagram showing a spherical aberration, an astigmatism, and a distortion of the imaging lens of FIG. 4.
Figure 7:
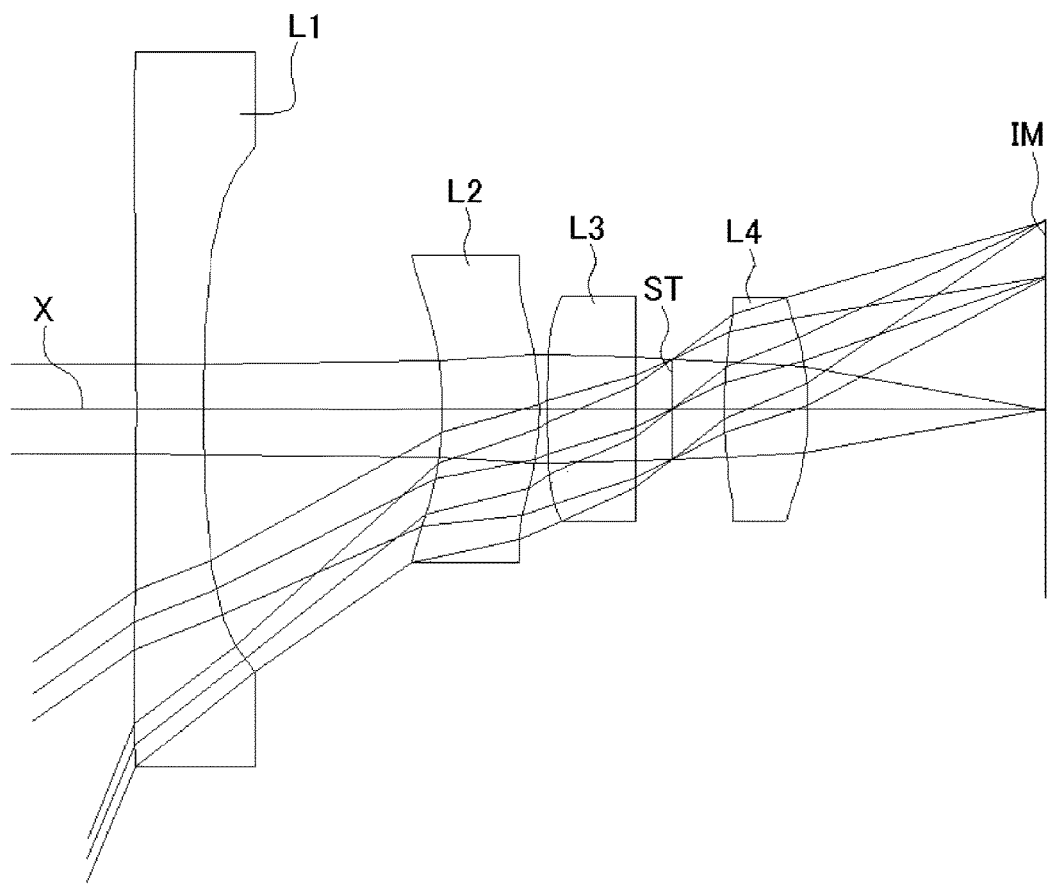
FIG. 7 shows a sectional view of a schematic configuration of an imaging lens in Numerical Data Example 3 according to the embodiment of the invention.

FIG. 5 shows the lateral aberration that corresponds to the image height ratio H of the imaging lens in Numerical Data Example 2, and FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

Numerical Data Example 3

Basic data are shown below.
f = 3.02 mm, Fno = 2.8, 2ω = 135.0°
Unit: mm

Surface Data

| Surface Number i | r | d | nd | vd |
|---|---|---|---|---|
| (Object) | ∞ | ∞ | | |
| 1* | −248.850 | 0.800 | 1.544 | 55.5 (=vd1) |
| 2* | 25.000 | 2.848 (=dA) | | |
| 3* | −3.930 | 1.158 | 1.636 | 23.9 (=vd2) |
| 4* | −3.239 | 0.097 | | |
| 5* | 18.267 | 1.057 | 1.536 | 23.9 (=vd3) |
| 6* | −33.373 | 0.419 | | |
| 7 (Stop) | ∞ | 0.630 | | |
| 8* | 6.930 | 0.998 | 1.544 | 55.5 (=vd4) |
| 9* | −3.312 | 2.839 | | |
| (Image plane) | ∞ | | | | f1 = −41.73 mm
f2 = 17.56 mm
f3 = 22.20 mm
f4 = 4.27 mm
f123 = 10.63 mm
f23 = 9.41 mm
L14 = 10.84 mm

Aspheric Surface Data

First Surface k = 0.000, $A_4$ = −1.289E−04, $A_6$ = 1.462E−05, $A_8$ = −1.105E−07, $A_{10}$ = −8.510E−10
Second Surface k = 0.000, $A_4$ = 3.253E−03, $A_6$ = −6.480E−05, $A_8$ = −6.984E−06, $A_{10}$ = 2.641E−06, $A_{12}$ = 6.831E−10
Third Surface k = 0.000, $A_4$ = 1.680E−03, $A_6$ = 1.677E−03
Fourth Surface k = 0.000, $A_4$ = 1.600E−02, $A_6$ = 5.051E−03
Fifth Surface k = 0.000, $A_4$ = 6.517E−03, $A_6$ = 1.653E−02
Sixth Surface k = −4.226E+01, $A_4$ = −1.276E−02, $A_6$ = 3.172E−02
Eighth Surface k = 0.000, $A_4$ = 2.268E−03, $A_6$ = 3.209E−04
Ninth Surface k = 0.000, $A_4$ = −2.291E−03, $A_6$ = 3.967E−03

The values of the respective conditional expressions are as follows:

f4/f = 1.41
f1/f = −13.82
f4/f23 = 0.45
dA/f = 0.94
f123/f = 3.52

Accordingly, the imaging lens of Numerical Data Example 3 satisfies the above-described conditional expressions.

Figure 8:
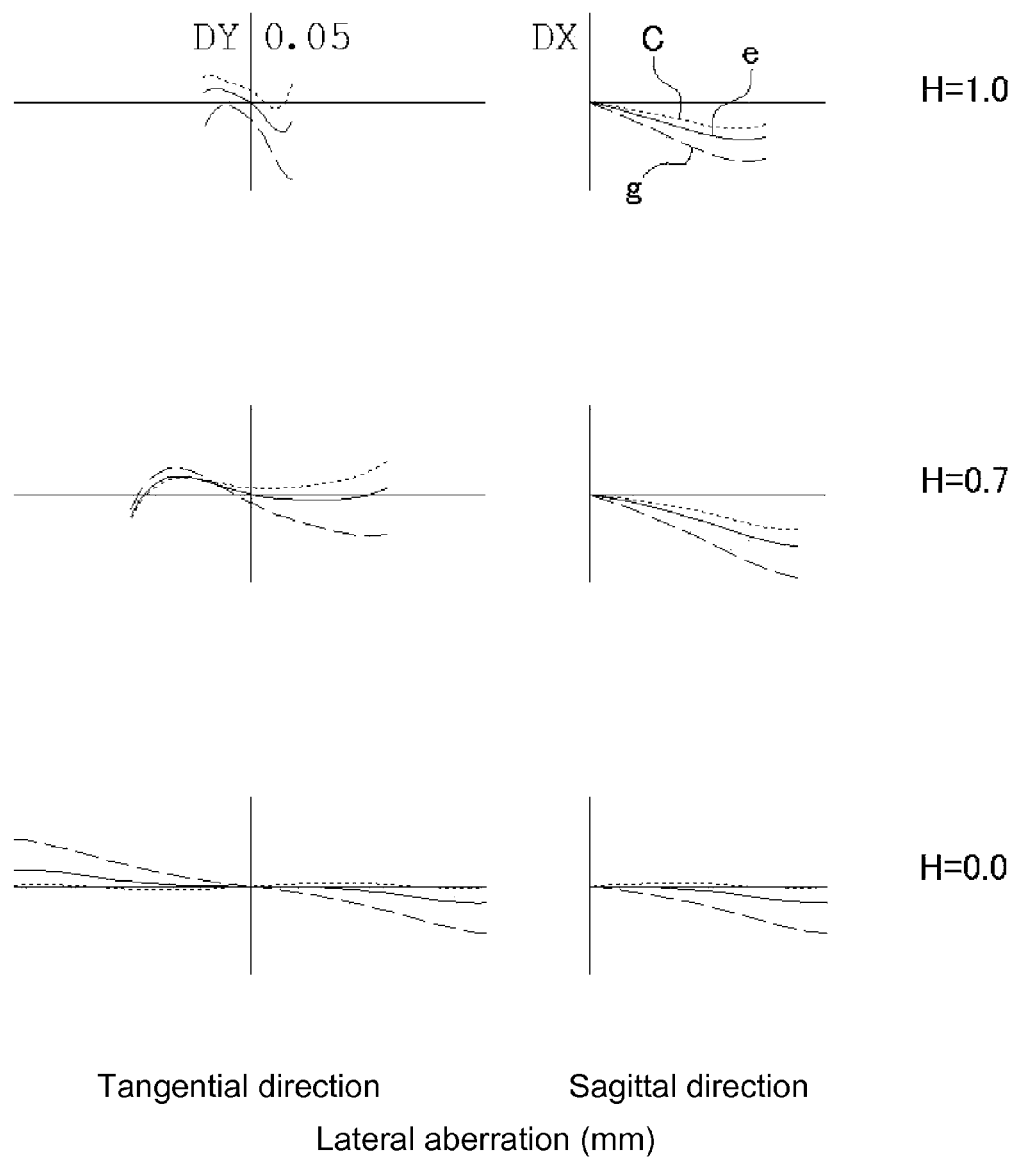
FIG. 8 is an aberration diagram showing a lateral aberration of the imaging lens of FIG. 7.
Figure 9:
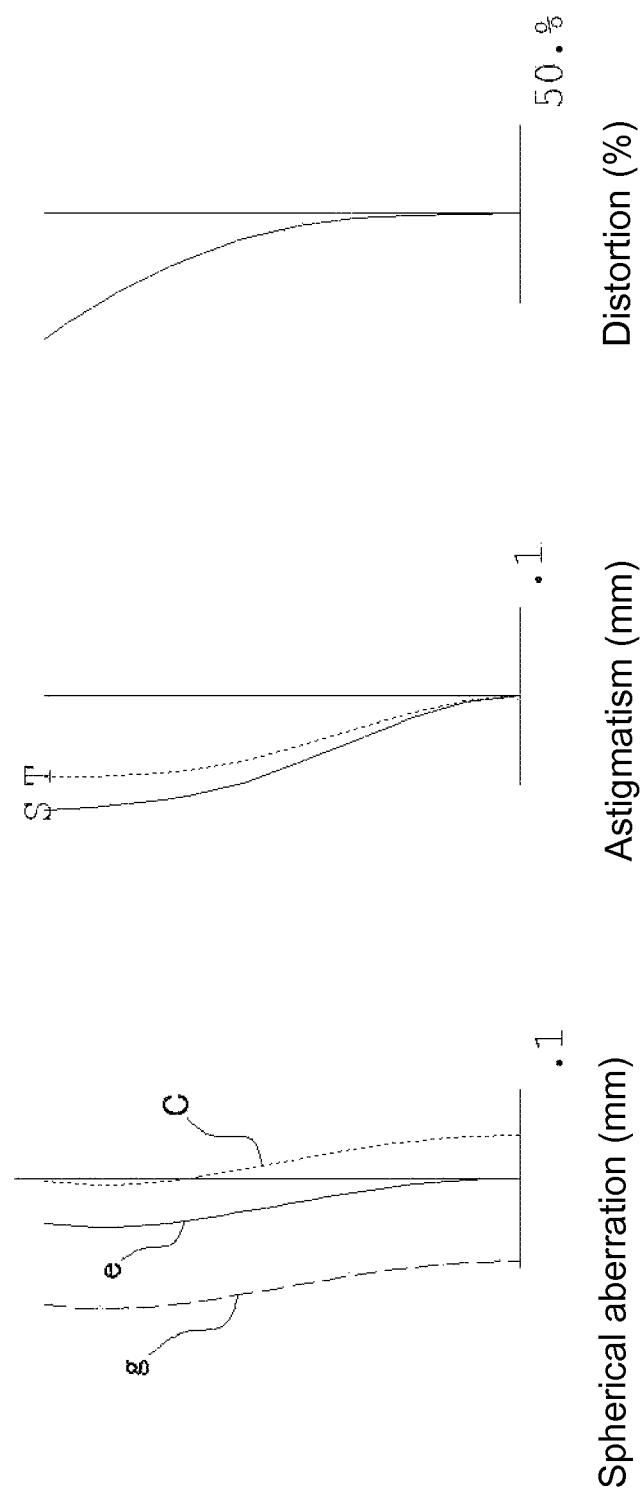
FIG. 9 is an aberration diagram showing a spherical aberration, an astigmatism, and a distortion of the imaging lens of FIG. 7.
Figure 10:
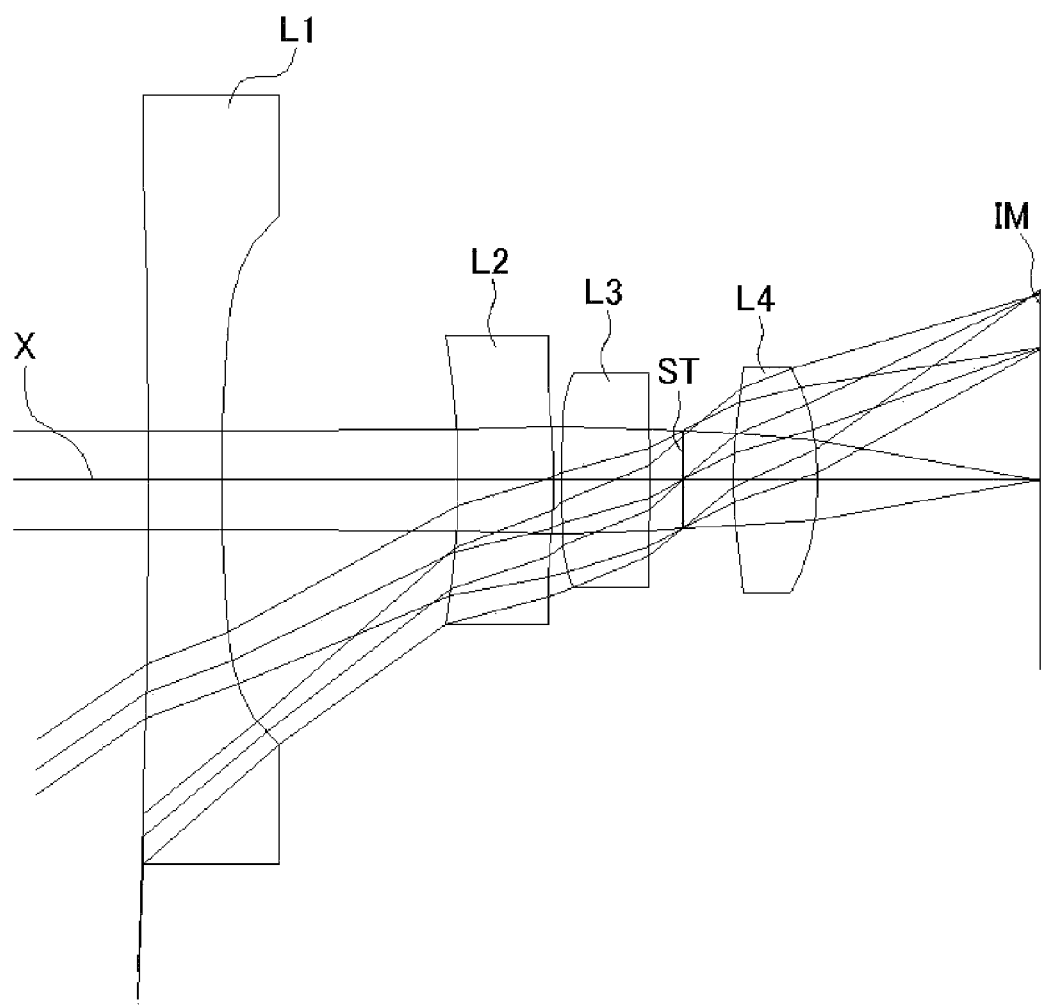
FIG. 10 shows a sectional view of a schematic configuration of an imaging lens in Numerical Data Example 4 according to the embodiment of the invention.

FIG. 8 shows the lateral aberration that corresponds to the image height ratio H of the imaging lens in Numerical Data Example 3, and FIG. 9 shows a spherical aberration (mm), an astigmatism (mm), and a distortion (%), respectively. As shown in FIGS. 8 and 9, according to the imaging lens of Numerical Data Example 3, the aberrations are also satisfactorily corrected.

Numerical Data Example 4

Basic data are shown below.
f = 3.30 mm, Fno = 2.8, 2ω = 168.0°
Unit: mm

Surface Data

| Surface Number i | r | d | nd | vd |
|---|---|---|---|---|
| (Object) | ∞ | ∞ | | |
| 1* | −248.850 | 0.890 | 1.544 | 55.5 (=vd1) |
| 2* | 96.273 | 2.800 (=dA) | | |
| 3* | −10.597 | 1.150 | 1.636 | 23.9 (=vd2) |
| 4* | −6.482 | 0.090 | | |
| 5* | 24.205 | 1.050 | 1.636 | 23.9 (=vd3) |
| 6* | −21.063 | 0.400 | | |
| 7 (Stop) | ∞ | 0.600 | | |
| 8* | 5.528 | 1.000 | 1.544 | 55.5 (=vd4) |
| 9* | −3.791 | 2.678 | | |
| (Image plane) | ∞ | | | | f1 = −127.54 mm
f2 = 23.69 mm
f3 = 17.88 mm
f4 = 4.30 mm
f123 = 10.53 mm
f23 = 10.06 mm
L14 = 10.66 mm

Aspheric Surface Data

First Surface k = 0.000, $A_4$ = −2.979E−04, $A_6$ = 1.105E−05, $A_8$ = 9.195E−08, $A_{10}$ = −8.510E−10
Second Surface k = 0.000, $A_4$ = 4.338E−03, $A_6$ = −6.372E−05, $A_8$ = −3.828E−06, $A_{10}$ = 2.961E−06, $A_{12}$ = 6.831E−10
Third Surface k = 0.000, $A_4$ = 8.486E−04, $A_6$ = −5.634E−04
Fourth Surface k = 0.000, $A_4$ = 9.508E−03, $A_6$ = 7.337E−03
Fifth Surface k = 0.000, $A_4$ = 1.738E−02, $A_6$ = 1.307E−02
Sixth Surface k = −4.226E+01, $A_4$ = 1.037E−02, $A_6$ = 2.811E−03
Eighth Surface k = 0.000, $A_4$ = −2.094E−02, $A_6$ = 3.381E−03
Ninth Surface k = 0.000, $A_4$ = −2.488E−02, $A_6$ = 2.038E−03

The values of the respective conditional expressions are as follows:

f4/f = 1.30
f1/f = −38.66
f4/f23 = 0.43
dA/f = 0.85
f123/f = 3.19

Accordingly, the imaging lens of Numerical Data Example 4 satisfies the above-described conditional expressions.

Figure 11:
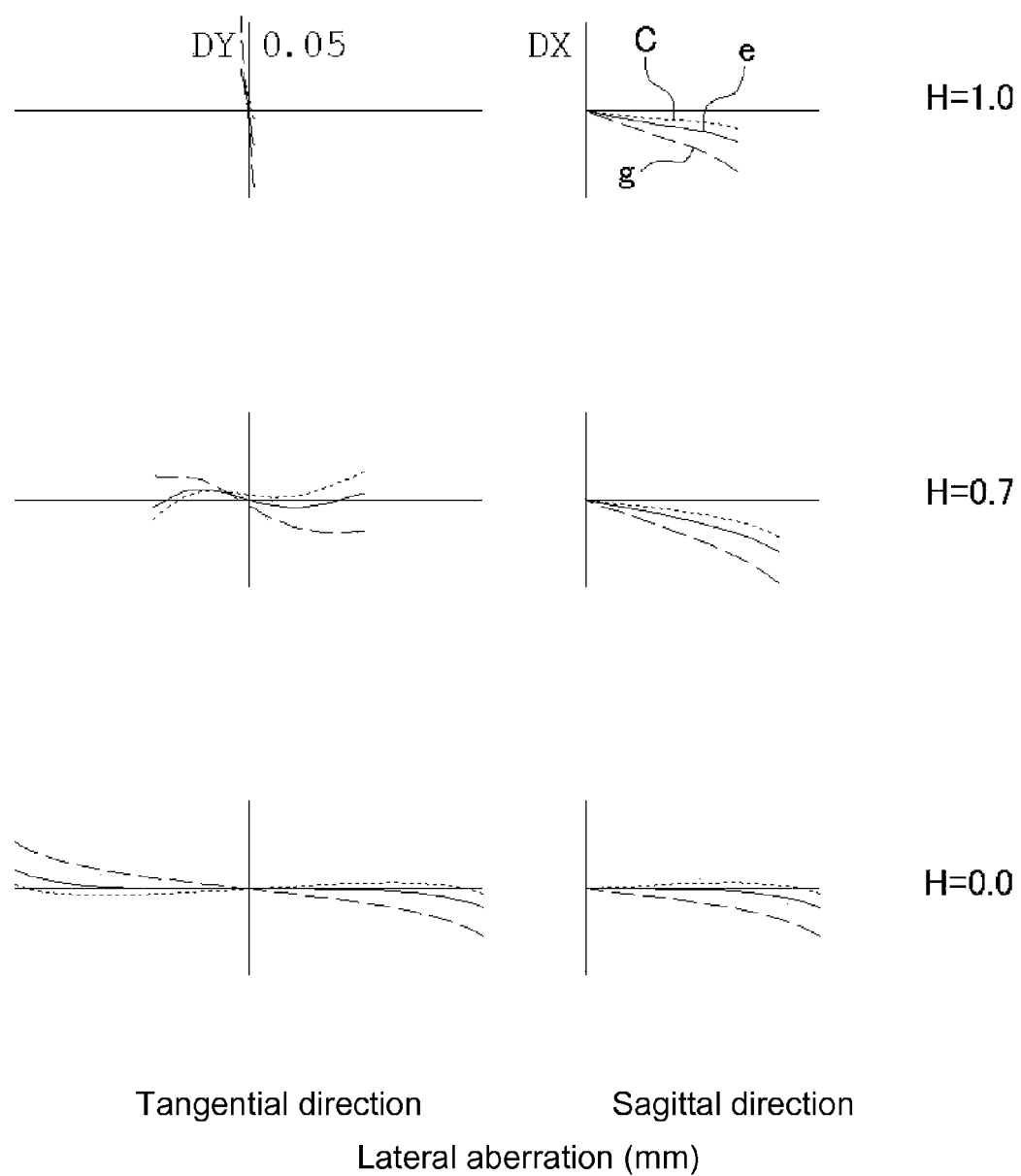
FIG. 11 is an aberration diagram showing a lateral aberration of the imaging lens of FIG. 10.
Figure 12:
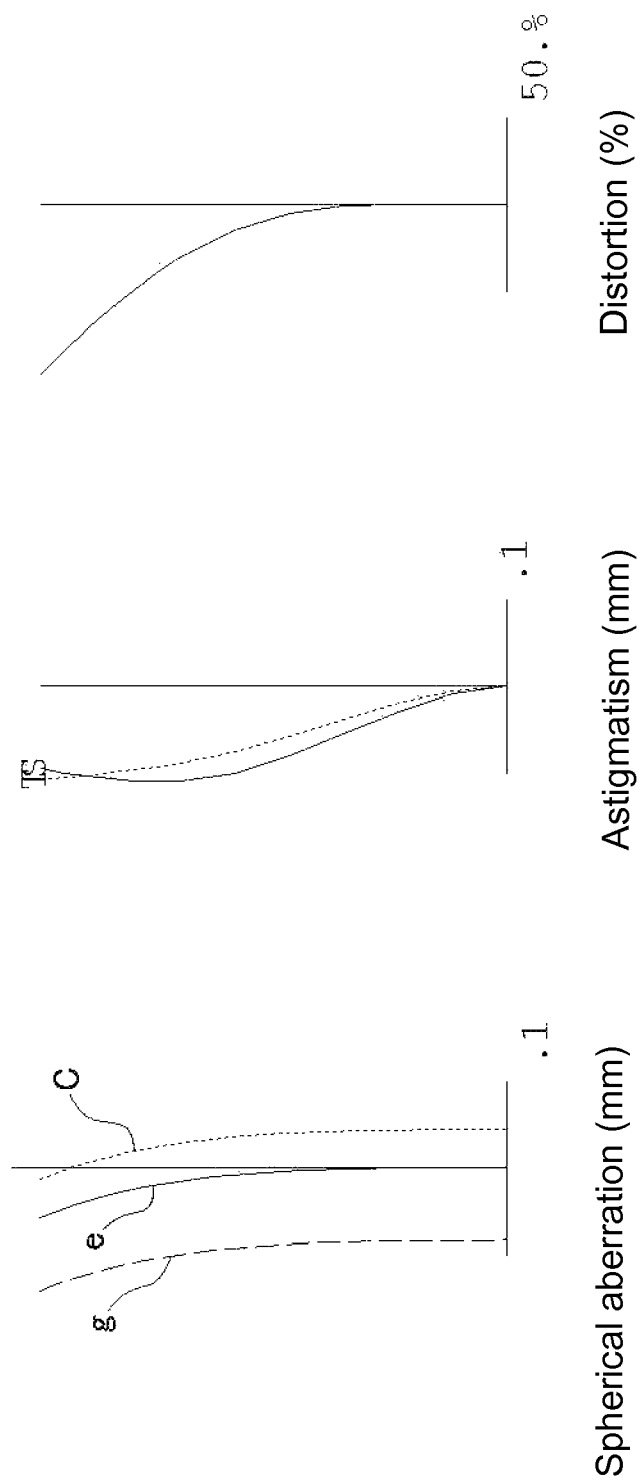
FIG. 12 is an aberration diagram showing a spherical aberration, an astigmatism, and a distortion of the imaging lens of FIG. 10.
Figure 13:
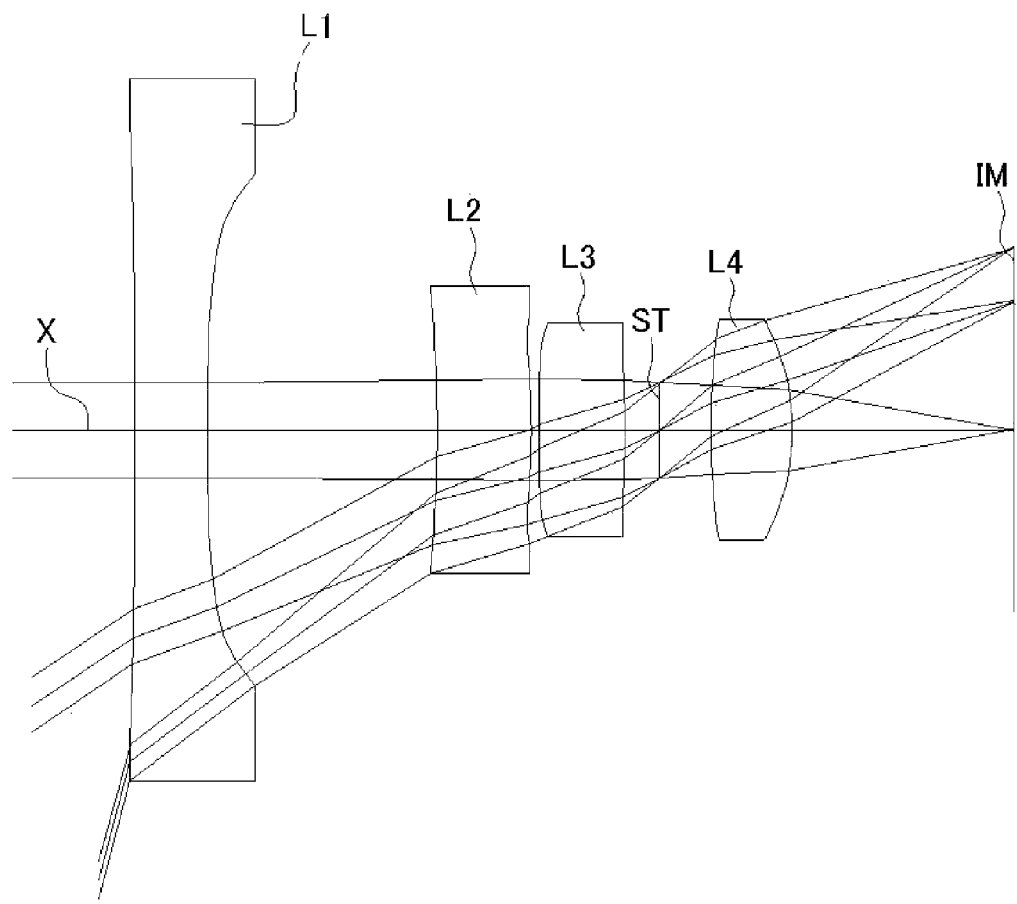
FIG. 13 shows a sectional view of a schematic configuration of an imaging lens in Numerical Data Example 5 according to the embodiment of the invention.

FIG. 11 shows the lateral aberration that corresponds to the image height ratio H of the imaging lens in Numerical Data Example 4, and FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

Numerical Data Example 5

Basic data are shown below.
f = 3.30 mm, Fno = 2.8, 2ω = 146.7°
Unit: mm

Surface Data

| Surface Number i | r | d | nd | vd |
|---|---|---|---|---|
| (Object) | ∞ | ∞ | | |
| 1* | −248.850 | 0.893 | 1.544 | 55.5 (=vd1) |
| 2* | 115.367 | 2.814 (=dA) | | |
| 3* | −16.119 | 1.155 | 1.636 | 23.9 (=vd2) |
| 4* | −8.116 | 0.097 | | |
| 5* | −63.307 | 1.050 | 1.636 | 23.9 (=vd3) |
| 6* | −9.562 | 0.420 | | |
| 7 (Stop) | ∞ | 0.630 | | |
| 8* | 7.276 | 0.998 | 1.544 | 55.5 (=vd4) |
| 9* | −3.238 | 2.741 | | |
| (Image plane) | ∞ | | | | f1 = −144.83 mm
f2 = 24.36 mm
f3 = 17.59 mm
f4 = 4.26 mm
f123 = 10.68 mm
f23 = 10.26 mm
L14 = 10.80 mm

Aspheric Surface Data

First Surface k = 0.000, $A_4$ = −2.576E−04, $A_6$ = 1.094E−05, $A_8$ = −6.006E−08, $A_{10}$ = −8.510E−10
Second Surface k = 0.000, $A_4$ = 4.090E−03, $A_6$ = −6.675E−05, $A_8$ = −8.552E−07, $A_{10}$ = 2.301E−06, $A_{12}$ = 6.831E−10
Third Surface k = 0.000, $A_4$ = 1.670E−03, $A_6$ = −2.059E−04
Fourth Surface k = 0.000, $A_4$ = 8.602E−03, $A_6$ = 8.250E−03
Fifth Surface k = 0.000, $A_4$ = 1.921E−02, $A_6$ = 1.172E−02
Sixth Surface k = −4.226E+01, $A_4$ = 1.169E−02, $A_6$ = 2.427E−03
Eighth Surface k = 0.000, $A_4$ = −1.509E−02, $A_6$ = 4.174E−03
Ninth Surface k = 0.000, $A_4$ = −2.029E−02, $A_6$ = 3.808E−03

The values of the respective conditional expressions are as follows:

f4/f = 1.29
f1/f = −43.89
f4/f23 = 0.42
dA/f = 0.85
f123/f = 3.24

Accordingly, the imaging lens of Numerical Data Example 5 satisfies the above-described conditional expressions.

Figure 14:
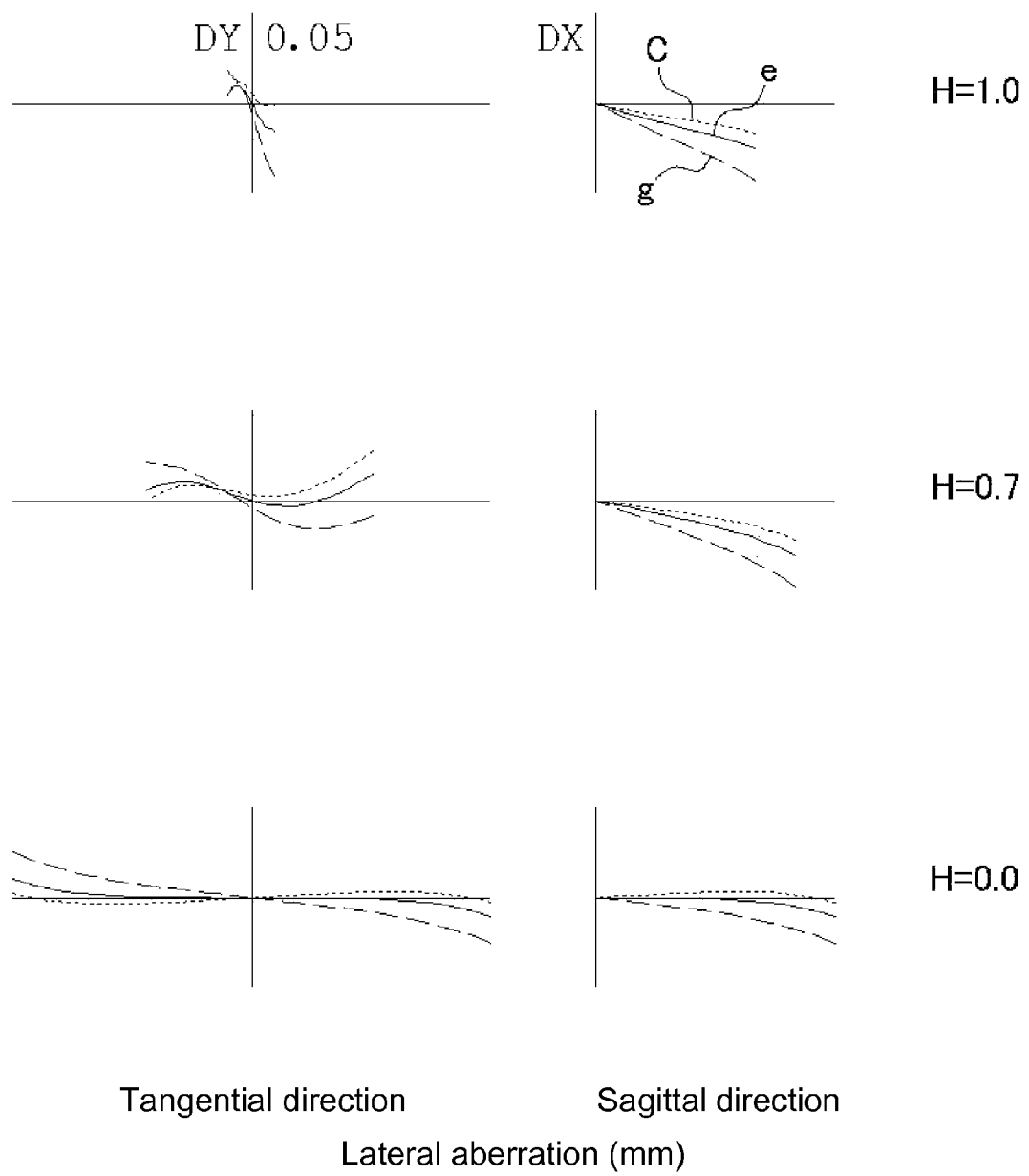
FIG. 14 is an aberration diagram showing a lateral aberration of the imaging lens of FIG. 13.
Figure 15:
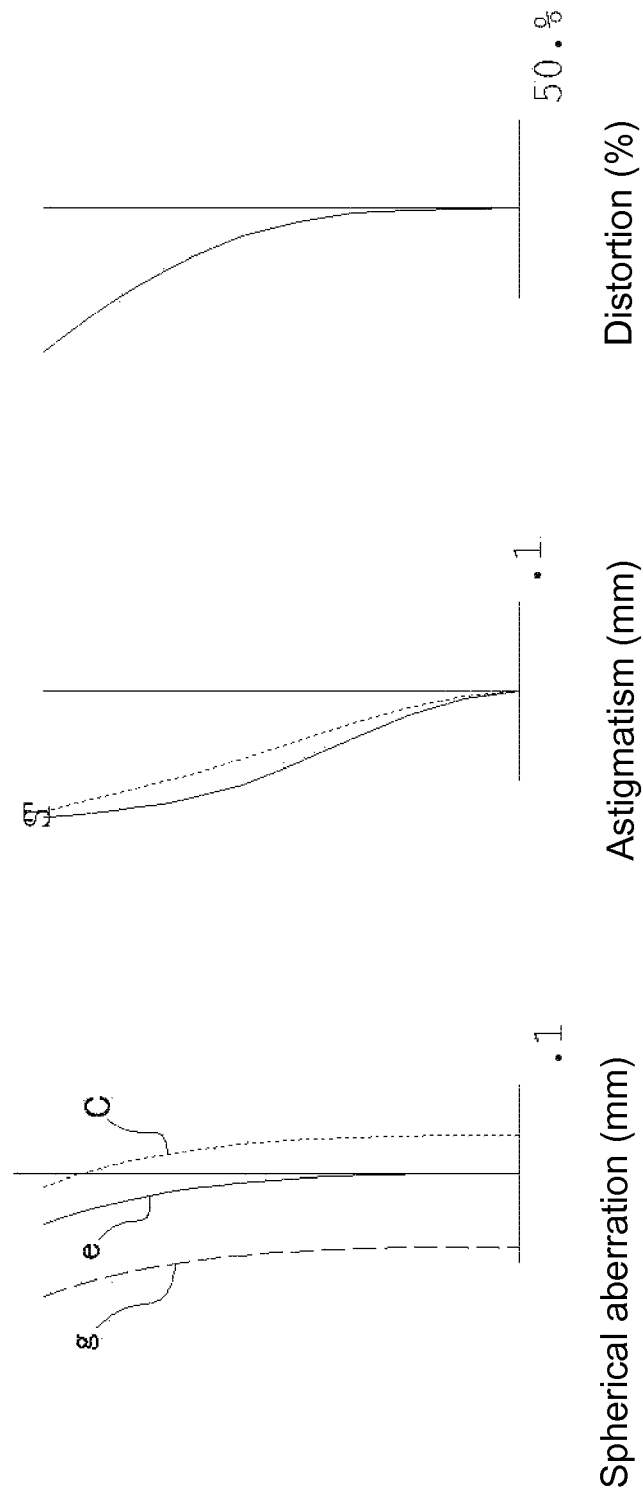
FIG. 15 is an aberration diagram showing a spherical aberration, an astigmatism, and a distortion of the imaging lens of FIG. 13.
Figure 16:
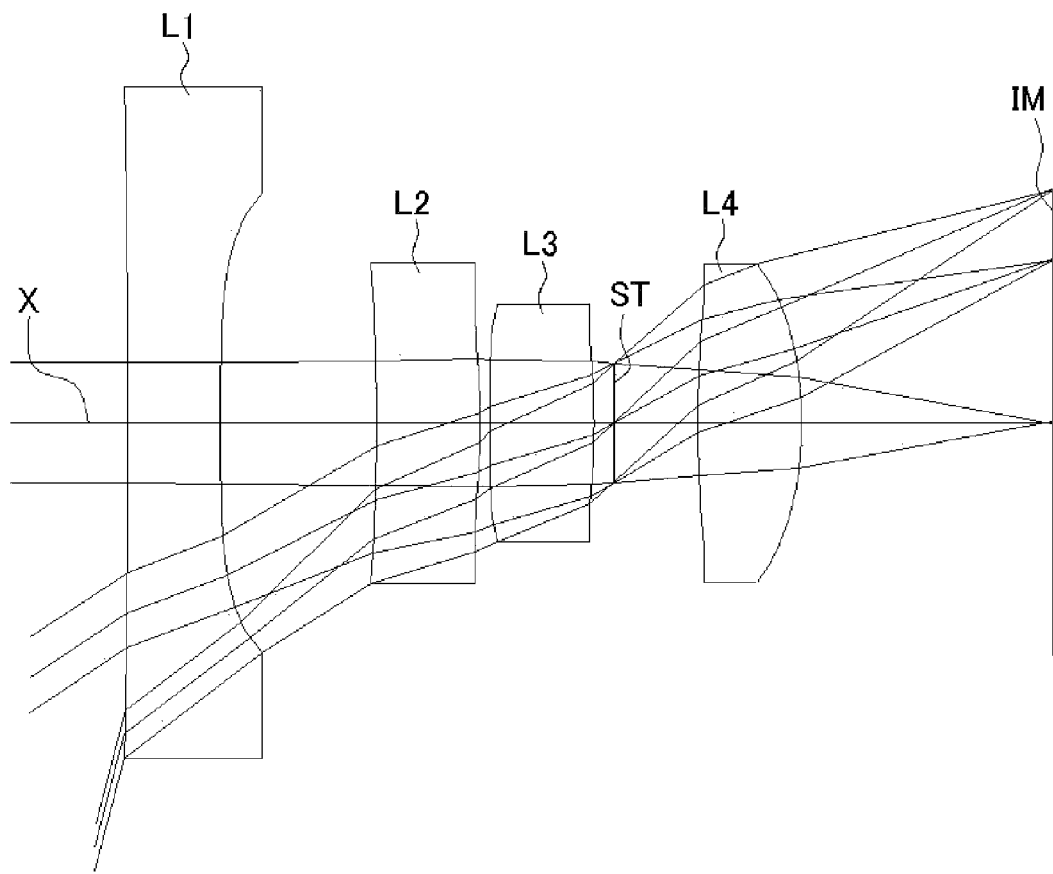
FIG. 16 shows a sectional view of a schematic configuration of an imaging lens in Numerical Data Example 6 according to the embodiment of the invention.

FIG. 14 shows the lateral aberration that corresponds to the image height ratio H of the imaging lens in Numerical Data Example 5, and FIG. 15 shows a spherical aberration (mm), an astigmatism (mm), and a distortion (%), respectively. As shown in FIGS. 14 and 15, according to the imaging lens of Numerical Data Example 5, the aberrations are also satisfactorily corrected.

Next, the imaging lens of Numerical Data Example 6 will be described. According to the imaging lens of Numerical Data Example 6, the fourth lens L4 is made of a glass-based material. Therefore, according to the imaging lens of Numerical Data Example 6, it is possible to suitably restrain fluctuation of the focal length due to temperature changes in the surrounding environment.

Numerical Data Example 6

Basic data are shown below.
f = 3.29 mm, Fno = 2.8, 2ω = 146.0°
Unit: mm

Surface Data

| Surface Number i | r | d | nd | vd |
|---|---|---|---|---|
| (Object) | ∞ | ∞ | | |
| 1* | −248.850 | 0.893 | 1.544 | 55.5 (=vd1) |
| 2* | 122.072 | 1.500 (=dA) | | |
| 3* | −23.343 | 1.000 | 1.636 | 23.9 (=vd2) |
| 4* | −7.926 | 0.097 | | |
| 5* | −149.695 | 1.000 | 1.636 | 23.9 (=vd3) |
| 6* | −7.011 | 0.200 | | |
| 7 (Stop) | ∞ | 0.800 | | |
| 8* | 8.308 | 0.998 | 1.619 | 63.9 (=vd4) |
| 9* | −4.392 | 2.445 | | |
| (Image plane) | ∞ | | | | f1 = −150.48 mm
f2 = 18.42 mm
f3 = 11.54 mm
f4 = 4.79 mm
f123 = 7.41 mm
f23 = 7.20 mm
L14 = 8.93 mm

Aspheric Surface Data

First Surface k = 0.000, $A_4$ = −2.576E−04, $A_6$ = 1.094E−05, $A_8$ = −6.006E−08, $A_{10}$ = −8.510E−10
Second Surface k = 0.000, $A_4$ = 1.196E−02, $A_6$ = −3.436E−04, $A_8$ = 1.043E−05, $A_{10}$ = 4.409E−05, $A_{12}$ = 6.831E−10
Third Surface k = 0.000, $A_4$ = 1.068E−03, $A_6$ = −8.122E−04
Fourth Surface k = 0.000, $A_4$ = 9.022E−03, $A_6$ = 9.202E−03
Fifth Surface k = 0.000, $A_4$ = 2.915E−02, $A_6$ = 1.310E−02
Sixth Surface k = −4.226E+01, $A_4$ = −1.975E−03, $A_6$ = 1.276E−02
Eighth Surface k = 0.000, $A_4$ = −1.941E−02, $A_6$ = 3.219E−03
Ninth Surface k = 0.000, $A_4$ = −3.233E−02, $A_6$ = 2.626E−03

The values of the respective conditional expressions are as follows:

-continued

Basic data are shown below.
f = 3.29 mm, Fno = 2.8, 2ω = 146.0°
Unit: mm f4/f = 1.46
f1/f = −45.71
f4/f23 = 0.67
dA/f = 0.46
f123/f = 2.25

Accordingly, the imaging lens of Numerical Data Example 6 satisfies the above-described conditional expressions. Therefore, according to the imaging lens, it is possible to satisfactorily correct aberrations in spite of the wide angle thereof.

Figure 17:
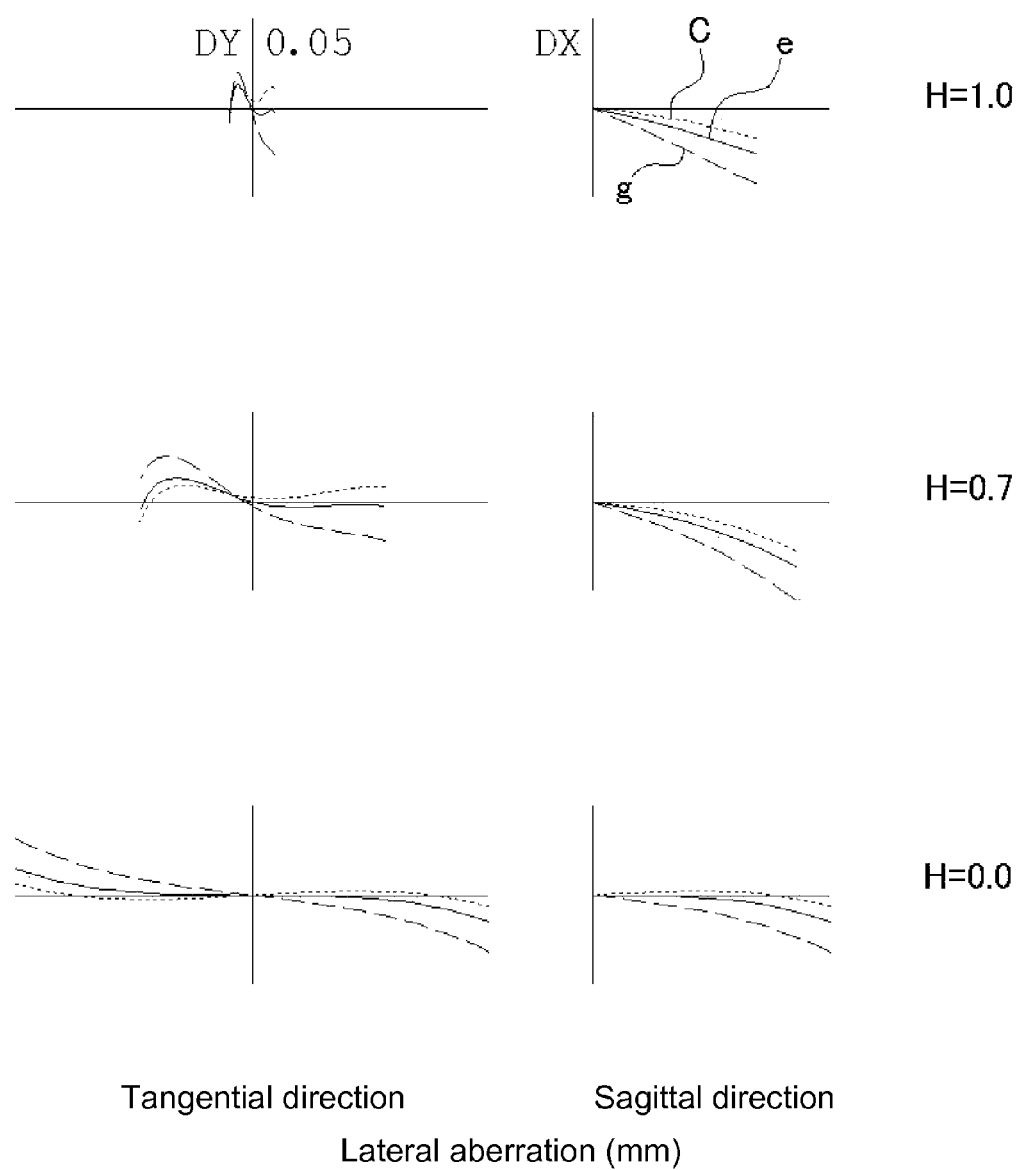
FIG. 17 is an aberration diagram showing a lateral aberration of the imaging lens of FIG. 16.
Figure 18:
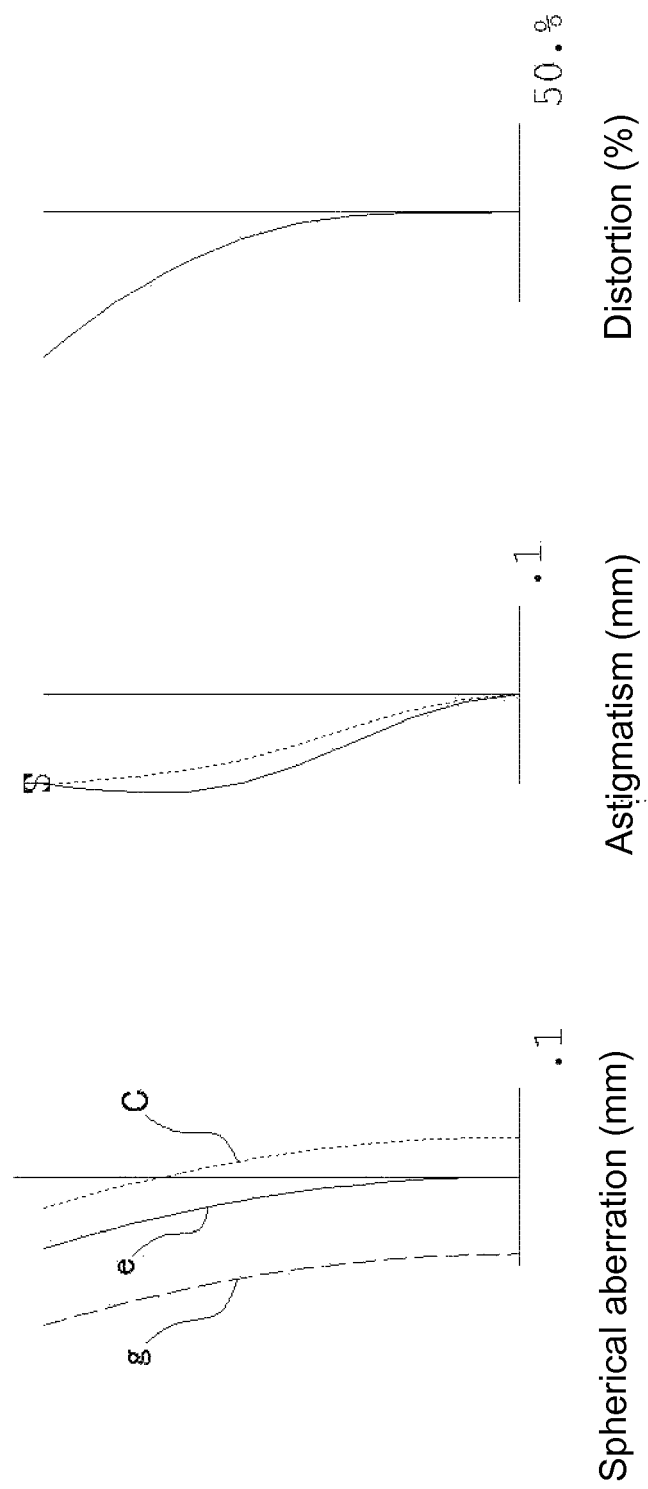
FIG. 18 is an aberration diagram showing a spherical aberration, an astigmatism, and a distortion of the imaging lens of FIG. 16.

FIG. 17 shows a lateral aberration that corresponds to the image height ratio H of the imaging lens in Numerical Data Example 6, and FIG. 18 shows a spherical aberration (mm), an astigmatism (mm), and a distortion (%), respectively. As shown in FIGS. 17 and 18, according to the imaging lens of Numerical Data Example 6, the aberrations are also satisfactorily corrected.

According to the imaging lens of the embodiment described above, it is achievable to obtain an angle of view (2ω) that is not smaller than 135°. For reference, the imaging lenses of Numerical Data Example 1 to 6 attain the angles of view that are as wide as 135.0° to 168.0°.

Here, according to each Numerical Data Example, a surface of each lens is formed as an aspheric surface, but if there is certain flexibility in the total length of the imaging lens or required optical performances, it is also possible to form all or a part of the lens surfaces as spherical surfaces.

Accordingly, when the imaging lens of the embodiment is applied in an optical system for mounting in cameras such as cellular phones, digital still cameras, portable information terminals, security cameras, onboard cameras, network cameras, video conferencing cameras, fiberscopes, and capsulated endoscopes, it is achievable to obtain both high functionality and downsizing of the cameras.

The invention may be applied in an imaging lens for mounting in a device that is required to have a wide angle of view as an imaging lens and satisfactory aberration correction performance, as well as to minimize fluctuation of a focal length due to temperature changes in the surrounding environment or other cause, e.g. a security camera or onboard camera. Furthermore, the invention may be applied in an imaging lens for mounting in a device, which is required to have a wide angle of view as an imaging lens and to be inexpensive, for example a camera such as a cellular phone, smartphone, network camera, and encapsulated endoscope.

The disclosure of Japanese Patent Application No. 2012-262095, filed on Nov. 30, 2012, is incorporated in the application by reference.

While the present invention has been explained with reference to the specific embodiments of the present invention, the explanation is illustrative and the present invention is limited only by the appended claims.

What is claimed is:

1. An imaging lens comprising:
a first lens having negative refractive power;
a second lens having positive refractive power;
a third lens; and
a fourth lens, arranged in this order from an object side to an image plane side,
wherein said first lens is formed in a shape so that a surface thereof on the image plane side has a positive curvature radius, and
said first lens has a focal length f1, and said first lens is situated away from the second lens by a distance dA on an optical axis thereof so that the following conditional expressions are satisfied:

$-75 < f1/f \leq -13.818$ $0.3 < dA/f < 1.0$ where f is a focal length of a whole lens system.

2. The imaging lens according to claim 1, wherein said fourth lens has positive refractive power.

3. The imaging lens according to claim 1, wherein said first lens has an Abbe's number vd1 so that the following conditional expression is satisfied:

$45 < vd1 < 70$.

4. The imaging lens according to claim 1, wherein said fourth lens has a focal length f4 so that the following conditional expression is satisfied:

$1.0 < f4/f < 2.5$ where f is the focal length of the whole lens system.

5. The imaging lens according to claim 1, wherein said third lens has an Abbe's number vd3 so that the following conditional expression is satisfied:

$20 < vd3 < 40$.

6. The imaging lens according to claim 1, wherein said fourth lens has an Abbe's number vd4 so that the following conditional expression is satisfied:

$45 < vd4 < 70$.

7. An imaging lens comprising:
a first lens having negative refractive power;
a second lens having positive refractive power;
a third lens; and
a fourth lens, arranged in this order from an object side to an image plane side,
wherein each of said first lens, said second lens, said third lens, and said fourth lens is formed of one single lens,
said second lens is arranged to face the third lens,
said second lens is formed in a shape so that a surface thereof on the object side has a negative curvature radius, and
said first lens is situated away from the second lens by a distance dA on an optical axis thereof, said first lens has an Abbe's number vd1, and said third lens has an Abbe's number vd3 so that the following conditional expressions are satisfied:

$0.3 < dA/f < 1.0$ $45 < vd1 < 70$ $20 < vd3 < 40$ where f is a focal length of a whole lens system.

8. The imaging lens according to claim 7, wherein said fourth lens has positive refractive power.

9. The imaging lens according to claim 7, wherein said fourth lens has a focal length f4 so that the following conditional expression is satisfied:

$1.0 < f4/f < 2.5$ where f is the focal length of the whole lens system.

10. The imaging lens according to claim 7, wherein said fourth lens has an Abbe's number vd4 so that the following conditional expression is satisfied:

45<vd4<70.

11. An imaging lens comprising:
a first lens having negative refractive power;
a second lens having positive refractive power;
a third lens; and
a fourth lens, arranged in this order from an object side to an image plane side,
wherein each of said first lens, said second lens, said third lens, and said fourth lens is formed of one single lens,
said second lens is arranged to face the third lens,
said second lens is formed in a shape so that a surface thereof on the object side has a negative curvature radius, and
said first lens is situated away from the second lens by a distance dA on an optical axis thereof, said third lens has an Abbe's number vd3, and said fourth lens has an Abbe's number vd4 so that the following conditional expressions are satisfied:

$0.3 < dA/f < 1.0$ $20 < vd3 < 40$ $45 < vd4 < 70$ where f is a focal length of a whole lens system.

12. The imaging lens according to claim 11, wherein said fourth lens has positive refractive power.

13. The imaging lens according to claim 11, wherein said first lens has an Abbe's number vd1 so that the following conditional expression is satisfied:

$45 < vd1 < 70.$

14. The imaging lens according to claim 11, wherein said fourth lens has a focal length f4 so that the following conditional expression is satisfied:

$1.0 < f4/f < 2.5$ where f is the focal length of the whole lens system.

* * * * *